US012569772B2

(12) United States Patent　　　(10) Patent No.:　US 12,569,772 B2

Tyrrell et al.　　　　　　　　　　　(45) Date of Patent:　　Mar. 10, 2026

(54) METHODS FOR WINS GROWING OVER TIME

(71) Applicant: IGT, Las Vegas, NV (US)

(72) Inventors: George Tyrrell, Henderson, NV (US); Dwayne Nelson, Las Vegas, NV (US); Patrick Danielson, Las Vegas, NV (US); Nathya Nagarajan, Las Vegas, NV (US)

(73) Assignee: IGT, Las Vegas, NV (US)

( * ) Notice: Subject to any disclaimer, the term of this patent is extended or adjusted under 35 U.S.C. 154(b) by 361 days.

(21) Appl. No.: 18/083,728

(22) Filed: Dec. 19, 2022

(65) Prior Publication Data

US 2024/0198236 A1　　Jun. 20, 2024

(51) Int. Cl.
| *A63F 13/00* | (2014.01) |
| *A63F 13/35* | (2014.01) |
| *A63F 13/79* | (2014.01) |

(52) U.S. Cl.
CPC .............. *A63F 13/79* (2014.09); *A63F 13/35* (2014.09)

(58) Field of Classification Search
CPC ................................. A63F 13/79; A63F 13/35
See application file for complete search history.

(56) References Cited

U.S. PATENT DOCUMENTS

| 6,319,125 B1* | 11/2001 | Acres ...................... G07F 17/32 463/25 |
| 8,449,378 B2 | 5/2013 | Michaelson et al. |

| 10,741,017 B2 | 8/2020 | Silva |
| 10,885,740 B2 | 1/2021 | Higgins et al. |
| 11,792,026 B2 | 10/2023 | Nelson et al. |
| 2003/0036425 A1 | 2/2003 | Kaminkow et al. |
| 2003/0050111 A1* | 3/2003 | Saffari ................ G07F 17/3255 463/25 |
| 2003/0171148 A1* | 9/2003 | Weitz ................. H04N 21/4758 463/40 |
| 2004/0236944 A1* | 11/2004 | Walker ................... G16H 40/67 713/161 |
| 2006/0052169 A1 | 3/2006 | Britt et al. |
| 2006/0116207 A1* | 6/2006 | DeLeon ............. G07F 17/3237 463/42 |
| 2007/0057464 A1* | 3/2007 | Cockrell ................... A63F 1/00 273/303 |
| 2008/0242421 A1* | 10/2008 | Geisner ................. A63F 13/75 463/42 |
| 2013/0244787 A1* | 9/2013 | Hafezi ............... G07F 17/3276 463/42 |
| 2018/0139042 A1 | 5/2018 | Binning et al. |

(Continued)

OTHER PUBLICATIONS

Punishing Gray Raven Review https://medium.com/@pinkydinkyhere/punishing-gray-raven-review-bc62cfc8d5bc Apr. 19, 2020 Written by Pinky Dinky (Year: 2020).*

(Continued)

*Primary Examiner* — Jeffrey K Wong

(74) *Attorney, Agent, or Firm* — Sheridan Ross P.C.

(57)　　　　　　ABSTRACT

A gaming system rewards a player for maintaining a set of player engagement indicators in predetermined state. The state of the player engagement indicator depends directly upon a player engagement level with the gaming system measured over a selected time period, and the state itself determines one or more of an amount and probability of winning an award.

20 Claims, 13 Drawing Sheets

(56)  References Cited

U.S. PATENT DOCUMENTS

| | | |
|---|---|---|
| 2020/0213087 A1 | 7/2020 | Mazzarella |
| 2020/0273006 A1 | 8/2020 | Higgins et al. |
| 2022/0269324 A1 | 8/2022 | Rettger et al. |
| 2022/0292489 A1 | 9/2022 | Mackay et al. |
| 2023/0421400 A1 | 12/2023 | Nelson et al. |
| 2023/0421401 A1 | 12/2023 | Nelson et al. |

OTHER PUBLICATIONS

Returning Players—Welcome Back Rewards https://www.reddit.com/r/PunishingGrayRaven/comments/qj5bva/returning_players_welcome_back_rewards/?rdt=50246 Posted by LadyNarayan (Year: 2022).*
THAINE "Homomorphic Encryption for Beginners: A Practical Guide (Part1)," Medium, Dec. 26, 2018, 13 pages [retrieved online Oct. 5, 2021 from: https://medium.com/privacy-preserving-natural-language-processing/homomorphic-encryption-for-beginners-a-practical-guide-part-1-b8f26d03a98a].
"Cryptocurrency wallet," Wikipedia, last edited Sep. 16, 2021, 6 pages [retrieved online Mar. 30, 2022 from: https://en.wikipedia.org/w/index.php?title=Cryptocurrency_wallet&oldid=1044729968].
"AntMiner," Bitcoin Wiki, last edited Apr. 6, 2014, 1 page [retrieved online from: en.bitcoin.it/w/index.php?title=AntMiner&oldid=46022].
"Cryptocurrency," Wikipedia, last edited Ju. 03, 2021, 24 pages [retrieved online from: en/wikipedia.org/wiki/Cryptocurrency].
"Directed Acyclic Graph (DAG)," CoinMarketCap, 2021, 4 pages [retrieved online on Jun. 8, 2021 from: coinmarketcap.com/alexandria/glossary/directed-acyclic-graph-dag].
"Distributed ledger," Wikipedia, last edited May 28, 2021, 3 pages [retrieved online on Jun. 9, 2021 from: en.wikipedia.org/wiki/Distributed_ledger].
"How do mining pools work?" Bitcoin Stack Exchange, 2018, 4 pages [bitcoin.stackexchange.com/questions/21769/how-do-mining-pools-work].
"Industrial Grade Gaming Products," American Portwell Technology, Inc., 2021, 9 pages [retrieved online on May 11, 2021 from: portwell.com/products/gaming.php].
"Mining pool," Wikipedia, last updated Apr. 25, 2021, 5 pages [retrieved online from: en.wikipedia.org/w/index.php?title=Mining_pool&oldid=1019715324].
"Mining Pools Explained," Binance Academy, Apr. 21, 2020, updated Apr. 28, 2021, 9 pages [retrieved online from: academy.binance.com/en/articles/mining-pools-explained].
"Pooled mining," Bitcoin Wiki, last edited on Jun. 23, 2020, 4 pages [retrieved online from: en.bitcoin.it/w/index.php?title=Pooled_mining&oldid=67988].
"Progressive jackpot," Wikipedia, last edited Feb. 1, 2021, 5 pages [retrieved online from: en.wikipedia.org/w/index.php?title=Progressive_jackpot&oldid=1004150597].
"The SAS system," University of Hawaii, Aug. 2010, 3 pages [retrieved online from: www2.hawaii.edu/~halina/603/SASintro.pdf].
Costello "How does a Bitcoin mining pool work?" Hashmart blog, Jan. 17, 2020, 9 pages [retrieved online from: medium.com/hashmart-blog/how-does-a-bitcoin-mining-pool-work-9cb04b239d30].
Frankenfield "Proof of Work (PoW)," Investopedia, updated Mar. 29, 2021, 10 pages [retrieved online from: www.investopedia.com/terms/p/proof-work.asp].
Hong "How Does Bitcoin Mining Work?" Investopedia, May 4, 2021, 22 pages [retrieved online from: www.investopedia.com/tech/how-does-bitcoin-mining-work/].
Lee "Explaining Directed Acylic Graph (DAG), The Real Blockchain 3.0," Forbes, Jan. 22, 20218, 5 pages [retrieved online from: www.forbes.com/sites/shermanlee/2018/01/22/explaining-directed-acylic-graph-dag-the-real-blockchain-3-0/?sh=37595245180b].
Seth "How Do Cryptocurrency Mining Pools Work?" Investopedia, Oct. 29, 2020, 11 pages [retrieved online from: www.investopedia.com/tech/how-do-mining-pools-work/].
Tulic "How do Mining Pools Work And How To Choose a Pool To Join?" CaptainAltcoin.com, Oct. 6, 2019, 11 pages [retrieved online from: captainaltcoin.com/what-is-pool-mining].

* cited by examiner

METHODS FOR WINS GROWING OVER TIME

BACKGROUND

The present disclosure is related to gaming systems and devices and, in particular, the use of such devices in connection with changing player awards over time.

In a typical casino, a player can play a variety of games of chance and/or skill on various types of electronic gaming machines. Most games have mathematically determined odds that ensure that the house has an advantage over the players. This advantage is called the house edge. Payout is the percentage of funds ("winnings") returned to players. In games such as poker where players play against each other, the house takes a commission called the rake.

Casinos sometimes give out player loyalty points and/or complimentary items or comps to gamblers. A casino loyalty system allows casino patrons to sign up for a player loyalty account. After providing the casino with personally identifiable information (e.g., name, home address, etc.) and optionally verifying his or her identity (via presentation of a government issued identification as required by the jurisdiction), the player is typically given a player loyalty card. Players can then present their player loyalty card throughout the casino when gambling or performing a purchase to earn rewards that can take numerous forms, including player loyalty points and free play (Xtra-Credit, etc.).

Loyalty points can be redeemed by players for free play or to pay for goods or other offers within the casino. For example, a player may be able to redeem 1000 points for a determined dollar value of free play. Players often accrue large point balances over time and spending them can be quite difficult, especially when players are geographically separated from the casino which they like to visit only once or twice a year, particularly if the casino has a points expiration program where points may expire a certain time period after issuance. To address this need by players to remotely redeem points, some casinos allow remote redemption of points for non-gambling use cases where players can redeem points for items such as gifts on a web site or to purchase magazine subscriptions or other items. Even these remote redemption programs have minimal offerings.

BRIEF SUMMARY

In certain embodiments, the present disclosure relates to a gaming system that rewards a player for maintaining a set of player engagement indicators in predetermined state. The state of the player engagement indicator depends directly upon a player engagement level with the gaming system measured over a selected time period, and the state itself determines one or more of an amount and probability of winning an award.

In some embodiments, a method includes the steps of receiving, through a network communications interface, a request from a player to create a player engagement indicator, wherein a state of the player engagement indicator depends upon a player engagement level measured over a selected time period; generating, by a processor, an electronic record associated with the player to define the player engagement indicator; determining, by the processor, a time period during which the player is not engaged with a gaming system, the determined time period being at least the selected time period; and in response to the determined time period of player nonengagement being at least the selected time period, updating, by the processor, the electronic record to change the player engagement indicator from a first state to a second state, wherein one or more of an amount and probability of winning an award for the first state is higher than the one or more of the amount and probability of winning the award for the second state.

In some embodiments, a gaming server comprises a network communications interface; a processor coupled with the network communications interface; and a memory coupled with and readable by the processor and storing therein a set of instructions. The set of instructions, when executed by the processor, causes the processor to: receive, through the network communications interface, an electronic message comprising a request from a player to create a player engagement indicator, wherein a parameter value of the player engagement indicator depends upon a player engagement level over time; generate an electronic record associated with the player to define the player engagement indicator; determine a time period during which the player is not engaged with the gaming system; and, in response to the determined time period of player nonengagement, update the electronic record to change the player engagement indicator from a first parameter value to a second parameter value, wherein one or more of an amount and probability of winning an award associated with the first parameter value is higher than the one or more of the amount and probability of winning the award associated with the second parameter value.

In some embodiments, a gaming server comprises a network communications interface; a processor coupled with the network communications interface; and a memory coupled with and readable by the processor and storing therein a set of instructions. The set of instructions, when executed by the processor, causes the processor to: receive, from a service window of a gaming machine and through the network communications interface, a request from a player to create a player engagement indicator, wherein a parameter value of the player engagement indicator depends upon a player engagement level as a function of time; create an electronic record associated with the player to define the player engagement indicator; send, through the network communications interface and to the service window, an electronic message acknowledging creation of the electronic record; determine a time period during which the player is not engaged with a gaming system interacting with the gaming server; in response to the determined time period of player nonengagement, update the electronic record to change the player engagement indicator from a first parameter value to a second parameter value, wherein one or more of an amount and probability of winning an award for the first parameter value is higher than the one or more of the amount and probability of winning the award for the second parameter value; and send, through the network communications interface, an electronic message to the player indicating the update of the electronic record to change the player engagement level.

Additional features and advantages are described herein and will be apparent from the following Description and the figures.

DETAILED DESCRIPTION

Figure 1:
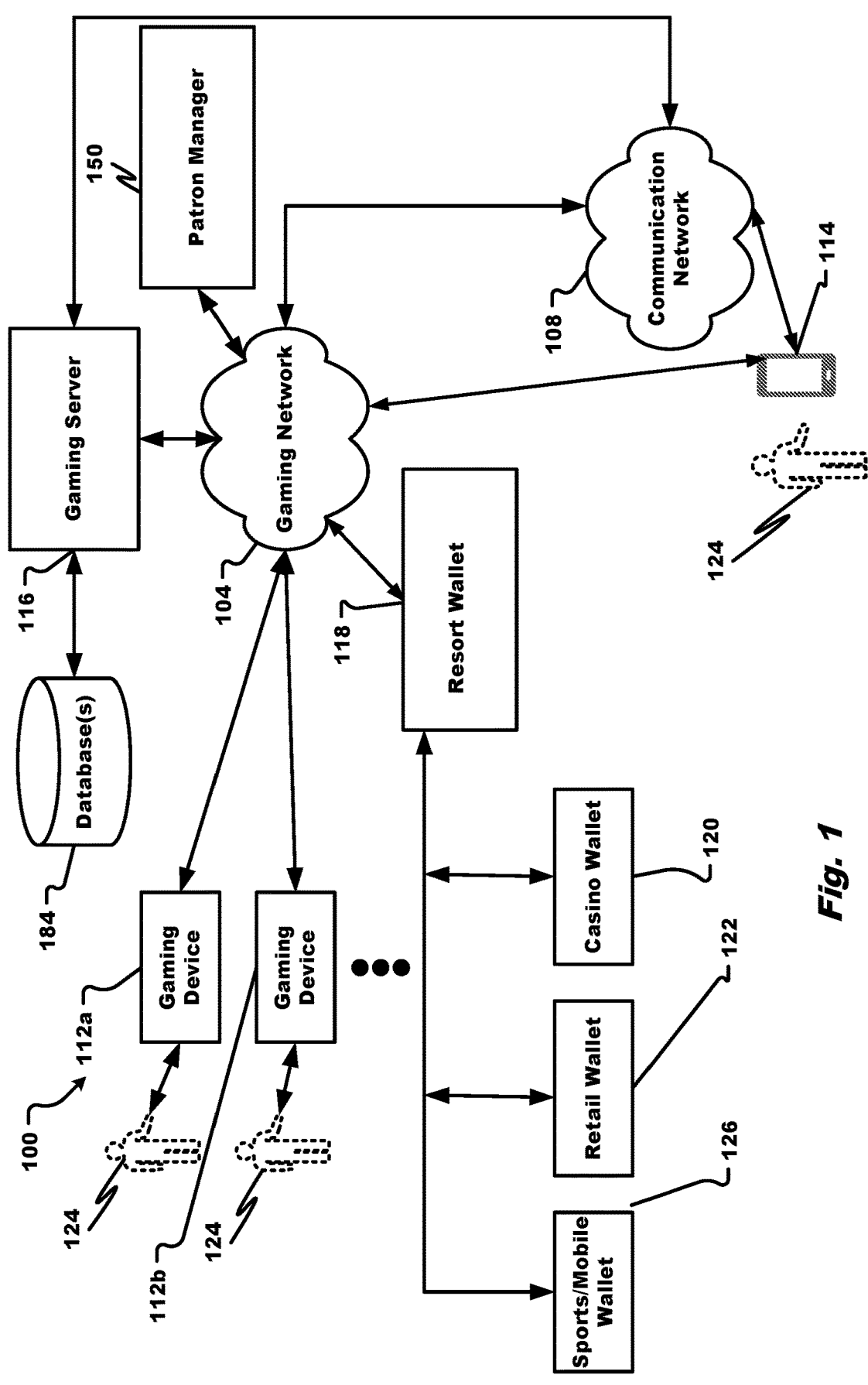
FIG. 1 is a block diagram of a gaming network in accordance with embodiments of the present disclosure.

Embodiments of the present disclosure will be described in connection with a gaming system having a capability to monitor player engagement over time and adjust awards in response to player engagement levels. While certain embodiments of the present disclosure will reference the use of gaming devices, such as an Electronic Gaming Machine (EGM), Electronic Gaming Table (EGT), virtual gaming machine, or video gaming gambling machine (VGM), as gaming devices, it should be appreciated that embodiments of the present disclosure can be used with any computer-controlled gaming device or collection of gaming devices or other devices controlled by a gaming server.

The adjusted award can be in the form of a monetary award and/or loyalty or social network or media point award. As used herein, a "loyalty point" refers to points that can be earned through designated activities or loyalty point initiation events at a gaming establishment, which activities can be tracked by means of tracking usage of a virtual or physical player loyalty card or associated loyalty account. Such establishments include casinos, hotels where gaming activities are provided, stores where gaming activities are permitted, Internet-based gaming activities, and the like.

Designated activities can include, but are not limited to, playing games or participating in gaming sessions, such as playing gaming machines, card games (such as pai gow poker, baccarat and poker), table games (such as roulette, craps, and keno), lotteries, betting on public event outcomes, etc. and other predetermined gaming activities. Other patronage activities at gaming establishments may accrue loyalty points, such as purchases of goods and services at the casino. Loyalty points commonly represent a form of credit accrued for patronage. The points can be redeemed for a variety of goods or services (or translated to other forms of credit) within a gaming establishment or affiliated establishment.

Typically, a loyalty point award is independent of the outcome of the game or gaming session but is based on an amount of monetary expenditure, such as for wagers on a gambling machine, wagers on table games, spend at various establishments in a casino (e.g., spa, restaurants, night clubs, etc.), hotel, and the like. Loyalty points can be not only player loyalty points but also free play (extra credit, non-cashable credits, and the like), gift points, comp dollars and others. Some of these points may be visible to players, while some may be visible to only casino staff. Some points may only be able to be used to fund certain types of free or incentivized activity at certain locations (e.g., slot machines), while not supporting free or incentivized player activity at other locations (e.g., the spa). Some points may have expiration times, while others may not have any expiration. The points can be redeemed for bonus cash or other rewards. Some loyalty programs use gamification, where the player needs to complete certain missions, or activities, to access the benefits.

The gaming system can change player awards over time in response to monitored levels of player engagement, thereby encouraging a player to return to the casino or go online to continue playing the game. The player can be rewarded for returning through the chance of increasing the win amounts. Likewise, the player can be penalized for low levels of player engagement over a selected time period through decreasing or nullifying win amounts. Player engagement can be determined by any number of selected metrics, including without limitation one or more of an amount of game play by a selected player over a selected time interval, an amount of money spent by the selected player over the selected time interval on gaming and/or non-gaming offerings of a gaming establishment, occurrence of a predetermined game event or game outcome, occurrence of a predetermined system event, occurrence of a random event such as generated by a pseudorandom or random number generator, and the like. In some embodiments, player engagement level is determined by a sequence of events such as playing a series of games, triggering a series of events, or making a series of transactions at the gaming establishment.

By way of nonlimiting example, the player wins an amount that, like a crop, must be maintained to grow. The player can grow and/or maintain the crops or win amounts over time by continuing to play the game. If the player does not grow or maintain the crops by performing defined or selected gaming activities, the crops do not grow or eat and die off (e.g., the amount reduces in amount or value).

While this example and other examples discussed herein are discussed with reference to farming, it is to be appreciated that any theme may be employed in implementing the player incentivization feature. Other themes for example include livestock, hunting game, and fishing.

It is to be further appreciated that no them is required in certain implementations. It is possible that the player does not plant anything and simply chooses to take a chance of getting a larger award by returning to a gaming session at a later time. For example, the player wins 100 credits, and the gaming session offers the player the ability to return to the gaming session sometime in the future for the potential to increase the award. In one embodiment, the player is shown the future award potential. For example, the player is given 100 credits and shown that it could grow to 110 credits if the player returns in the future. In one embodiment the player sees the progress of the increasing award amount. For example, the player wins 100 credits and elects to return later to the gaming session for a larger win. If the player checks the gaming session on the next day, the player might see the award has increased to 101 credits. When the player returns to the gaming session the following day, the player might see that the award has now increased to 102 credits. This award increase encourages the player to continue returning to the gaming session. In one embodiment the player is not shown the future potential. For example, the player is awarded 100 credits and is told that the award could be higher when the player next returns to the gaming session, yet the potential is not shown.

The amount of the award can directly depend on the parameter value of the corresponding player engagement indicator(s). For example, a higher parameter value indicates a higher level of player engagement and therefore a higher award amount; conversely, a lower parameter value indicates a lower level of player engagement and therefore a lower award amount.

In one embodiment, the player is not shown the initial value of the award. For example, the player enters the bonus and wins. The win amount is not shown to the player. Instead, the player is offered the ability to return to the gaming session in the future for an increased award. If the player chooses this option, the amount is revealed at the future date.

In one embodiment, the player is not given the award until he returns to the gaming session on a specified future date. To handle the case where the player does not return to the gaming device, the gaming system can either cancel the win and not pay the player, credit the player account for the base win amount of the win, or send the player an award such as a coupon for a discount at the buffet.

The player engagement indicators are not limited to a single player but can be shared cooperatively amongst multiple players in a player group (e.g., paramutual wagering). In one embodiment, a group of two or more players work on a common set of player engagement indicators. For example, a husband and wife could plant crops on the same field and then maintain each other's crops by sharing player engagement requirements to grow or maintain and harvest the crops. Stated differently, the player engagement and other activities of the husband and wife are collectively considered in ruleset application and setting the parameter value or state of the shared set of player engagement indicators. In other embodiments, each player in the multiplayer group has separate sets of player engagement indicators but share player engagement and other activities in setting parameter values or states of the indicators. Returning to the example above, the husband and wife could plant crops on separate fields and then maintain each other's crops by sharing player engagement requirements to grow or maintain and harvest the crops. Stated differently, the player engagement and other activities of the husband and wife are collectively considered in ruleset application and setting the parameter value or state of the separately owned sets of player engagement indicators.

In some embodiments, the gaming system receives, through a network communications interface, an electronic message comprising a request from a player to create a player engagement indicator. The parameter value or state of the player engagement indicator depends upon a player engagement level. The gaming system generates an electronic record associated with the player to define the player engagement indicator, such as assigning the player indicator an initial parameter value and/or first state (e.g., a "planted" state). The gaming system defines a rule set for the player engagement indicator, such as a maximum permissible time period for player nonengagement, maximum time to harvest or win the amount of the indicator in response to reaching a determined indicator parameter value or state, the maximum time in which to reach the determined parameter value or state, and the win or award amount when the indicator reaches the determined parameter value or state. The electronic record can define a plurality of engagement level indicators, each of the plurality of engagement level indicators corresponding to a different of set of player engagement rules and having a different amount and probability of winning the award and having different parameter values.

The player can request to transfer at least a portion of the award to the player engagement indicator with the parameter value of the player engagement indicator depending upon the transferred portion of the award. For example, the player can select the player engagement indicator from a set of player engagement indicators with each member of the set of player engagement indicators being associated with a different amount and/or probability of winning an award.

When a determined time period of player nonengagement or failure to engage the gaming system in a predetermined manner is more than the maximum permissible time period for player nonengagement, the gaming system updates the electronic record to change the player engagement indicator from a first parameter value to a lower second parameter value and/or from the first state to a fourth state (e.g., a "withered" state). The amount and/or probability of winning an award for the first parameter value or state is higher than for the second parameter value or fourth state.

The player can request to change or restore the parameter value of the player engagement indicator to the first or a different parameter value and/or second state (e.g., "maintained" or "growing" state) to a different state using a game activity outcome, monetary payment, and/or loyalty or social network or media point transfer. In the event of a game activity or outcome, such as occurrence of a selected game result of a gaming session and an intensity of play in the gaming session, the gaming system determines that the game result corresponds to a member of a predetermined set of game outcomes and, based on a determination that the game result corresponds to the member of the predetermined set of game outcomes, updates the electronic record associated with the player to change the player engagement indicator to a third parameter value having a higher amount and/or probability of winning an award. In the event of a monetary payment or loyalty or social network or media point transfer, the gaming system decrements the electronic record associated with the player and increments an electronic record associated with the gaming system to transfer a portion of a player account to a gaming system operator. Upon payment or transfer, the gaming system updates the electronic record associated with player to change the parameter value and/or state of the player engagement indicator from the second parameter value to the first parameter value and/or to a different parameter value or state.

When the player engages the gaming system in a predetermined manner, the gaming system determines a second time period of player engagement, and, when the second time period has at least a threshold parameter value, updates the electronic record associated with the player to change the player engagement indicator to a new parameter value and/or state (e.g., "maintained" or "growing" state) such that an amount and/or probability of winning an award is higher than for the prior parameter value and/or state of the player engagement indicator.

The player can "harvest" the award associated with the player engagement indicator when the player engagement indicator is at least a threshold parameter value and/or has a third state (e.g., "ready to harvest" state). The player can be notified by an electronic message sent to a gaming device of the player to redeem the award in a predetermined manner within a specified redemption period. When the player redeems the award in a predetermined manner within the specified redemption period, the gaming system updates the electronic record associated with the player to include transfer of the award by the gaming system and changes the parameter value of the player engagement indicator to a default parameter value or a completed state. When the player fails to redeem the award within the specified redemption period and/or in a predetermined manner, the gaming system updates the electronic record associated with the player to change the parameter value of the player engagement indicator to a parameter value different from the default parameter value and a prior parameter value of the player engagement indicator.

The ruleset for the engagement indicator(s) can condition any parameter value or state of a corresponding indicator on one or more of an amount of game play by the selected player over a selected time interval, an amount of money spent by the selected player over the selected time interval on gaming and non-gaming offerings of the gaming establishment, occurrence of a game event, occurrence of a system event, and occurrence of a random event. For example, players who trigger a royal flush or win a Lucky Coin event might be allowed to harvest the indicator. In some embodiments, the parameter value or state of an indicator is determined by a sequence of events such as playing a series of games, triggering a series of events, or making a series of transactions at the gaming establishment.

A given type of indicator can require different categories or tiers of players to have different rulesets. In some embodiments, the player loyalty or social network or media status (e.g. silver, gold, bronze) determines which types of indicators are available to the player for conversion. For example, gold level players might be allowed to select among first, second, and third indicator types, while silver players can only select between the second and third types of indicators and bronze players can only select the third type of indicators. Each type of indicator can have a different award amount, win probability or volatility and different rulesets.

Returning to the farm or cash harvest example above, the opportunity to participate in the player engagement feature can be a bonus-triggered gaming event where players can plant various types of crops (or player engagement indicators) that, if successfully germinated and grown, can be harvested by the player for loyalty or social network or media points, comps, extra credit, or a monetary award. The crops will grow over a configured timeframe thus requiring the player to return to a casino to harvest their crops, or remain at a gaming device, such as an Electronic Gaming Machine or EGM for an extended time period. This incentivizes players to continue their play time at the EGM as well as returning to the casino on another day or later time to harvest their crops. If a planted crop is not harvested in a timely manner, the crop will wither and die and no award is given. Alternatively when the crops wither, no additional award amount is given or the pay amount is lowered. The player may use some of their currently available loyalty or social network or media points or winnings to restore their crop for continued growth or for harvesting to receive their award. The player may use player loyalty or social network or media points, game credits, money, or achievements to restore the crops. For instance, the player may win the ability to restore crops. This feature encourages players to return to the casino or online gambling website or application to continue their gaming activity. Additionally, levels of player satisfaction and excitement can be increased by the ability to grow the bonus through continued gameplay and, in some embodiments, the harvested award is directly dependent upon an amount or level of gameplay. Stated differently, a bonus is awarded not only sooner but also at a greater amount when the player plays at a higher level or intensity of gameplay over time compared to a bonus award when the player plays at a lower level or intensity of gameplay.

The types of crops eligible for the player to plant (e.g., carrots, radishes, corn, wheat, rice, golden lotus, and the like) and the value of the harvested crops can be configurable to a player's tier level. The value of the harvested crops can be configurable to time played, coin-in and/or win/loss. The tiers of crops can be tied to player account status, game achievements or outcomes, or in game events.

The payment to the gaming system for creating, maintaining, restoring or harvesting player engagement indicators is not limited to monetary payments. In one embodiment, the player engagement indicators are created or "planted" with player points earned from a player loyalty or social network or media account. The player engagement indicators, when harvested, could yield player loyalty or social network or media points, money or prizes such as a free meal, show or service at a hotel. This embodiment would likely be implemented as a system feature with a player window on the EGM or slot machine interface board ("SMIB") that allows a player to plant, view, maintain and harvest the player engagement indicators (e.g., crops).

In one embodiment, the player is awarded some value. For example, the player may enter a bonus and win 100 credits. The farming theme may but does not need to apply in this example. The player is allowed to come back at a later time for the potential for the award to be more. For example, if the player returns the next day to the same game the award might be worth 105 credits. In other words, the award increases over time as the player has at least a threshold level of player engagement with the gaming system and decreases over time as the player has less than the threshold level of player engagement.

In one embodiment, the player is awarded some value, like the 100 credits above. The player is allowed to come back at a later time for the potential of a progressive win. For example, if the player returns the next day to the same game the award might be augmented by a progressive or even a Megajackpot award.

The feature can be implemented within a casino, via a gaming network, online, and/or via mobile or smartphone application. The crops can be awarded on any platform and maintained on any platform. For example, players can be allowed to maintain their crops online via a gaming system operators' home website.

Crop status updates can be sent as push and/or pull notifications to the player.

Players can login remotely via a mobile application in their mobile device to plant, maintain, and/or harvest their crops. The application for instance can allow the player to directly manage crops or to engage in some activity that waters or maintains or grows the crops. For example, the player might be able to play an online slot game (real wagers or social networking points) to water the crops. In this manner, the casino maintains a frequent relationship with the customer.

Because the player has motivation to farm the crops and increase or change the awards, the player has incentive to stay at the casino or to return. The farming can require the player to return to the casino. Depending on the configuration of the game and system, the player may be required to return multiple times over a period of time. For example, a player may be required to return to the casino each day for 4 days to manage the crops. Returning in person, or using a mobile application gives the casino the ability to engage the customer frequently, even daily.

The gaming system can implement the feature across myriad types or categories of gaming sessions, such as operating gaming functions and displaying a game (e.g., slot or poker, sports wagering, and electronic table gaming).

The technical problem of tracking of player engagement and nonengagement time periods can be accomplished by the technical solution of using login (e.g., card-in or mobile device login such as using Cardless Connect™ by IGT) and logout (e.g., card-out or mobile device logout) events of a given player. The time period for player nonengagement is determined by starting a system clock when the player logs out of the gaming system and stopping the clock when the player successfully logs on the gaming system, and the time period for player engagement is determined by starting a system clock when the player logs on the gaming system and stopping the clock when the player successfully logs out of the gaming system.

The volatility of the player engagement indicator parameter value or corresponding amount of probability of winning can be varied using a randomly or pseudo-randomly assigned variable changing the parameter value or state of the indicator. In the example above, the variable can correspond to a weather or climate condition (e.g., rain, moisture level, wind, hail, temperature, sunlight level or intensity, etc.), soil condition, or other crop growth or health factor. The volatility can even be indexed to actual weather or soil conditions for a selected geographic area.

Machine-to-machine communications and player input can be improved using an interactive service window on a host gaming device, the service window having an address on the gaming or communications network different from an address of the host gaming device itself, to exchange directly in bound and out bound electronic messages with a remote game server and display content to the player. The service window can slide into view either from the right, left, or top of the gaming display and offer interactive touch screen capabilities to the player. The content of the game theme on the display is unaffected or independent of the service window, which can be opened or closed by the player. The service window can be a fully interactive touch screen menu that players can use to activate bonus features, view messages or advertisements from the casino, play side games such as the incentivization feature, and manage a player account. The service window can enable the operator of the gaming system to embed the application for the incentivization feature into their home website.

As discussed below, network speed and management and memory management can also be improved using not only the machine-to-machine communications but also the data structures employed for the player engagement indicators.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a network according to embodiments of the present disclosure may include one, some, or all of the components depicted in the system 100 and does not necessarily have to include all of the components. For instance, the components may be distributed amongst a plurality of servers and/or gaming devices (e.g., an EGM, etc.) without departing from the scope of the present disclosure. The illustration of a single central gaming server 116 is for ease of discussion and should not be construed as limiting embodiments of the present disclosure to a single-server architecture.

The gaming system 100 is shown to include a gaming network 104 and a communication network 108. The gaming network 104 may correspond to a distributed set of devices that interconnect and facilitate machine-to-machine communications between one or multiple gaming devices 112a, b, . . . , a mobile device 114, a resort wallet 118 and associated casino wallet 120, retail wallet 122, and sports/mobile wallet 126, patron manager 150, and the gaming server 116.

The communication network 108 may correspond to a distributed set of devices that interconnect and facilitate machine-to-machine communications between the components of the gaming system 100 and external components including the mobile device 114. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112a, b, . . . are configured to communicate with the gaming server 116 using devices that are owned and administered by the same entity that administers security settings of the gaming devices 112a, b, . . . . As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112a, b, . . . . Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112*a, b,* . . . may be distributed throughout a single property or premises (e.g., a single casino floor) or the gaming devices 112*a, b,* . . . may be distributed among a plurality of different properties. In a situation where the gaming devices 112 *a, b,* . . . are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112 *a, b,* . . . may utilize the same or different types of communication protocols to connect with the gaming network 104. It should also be appreciated that the gaming devices 112 *a, b,* . . . may or may not present the same type or category of game to a player 124. It should be appreciated that a gaming device 112 *a, b,* . . . may correspond to one example of a gaming device. It should also be appreciated that the functions and features described in connection with a gaming device 112 *a, b,* . . . may be provided in any other type of gaming device without departing from the scope of the present disclosure.

In some embodiments, the gaming devices 112 *a, b,* . . . may be configured to communicate with a centralized management server in the form of the central gaming server 116. The central gaming server 116 may be configured to centrally manage games of chance, games of skill, or hybrid games of chance/skill played at the gaming devices 112 *a, b,* . . . (e.g., slot games), enable execution of a different game (e.g., a card game), monitor player 124 activity at the gaming devices 112 *a, b,* . . . , track player 124 association with a gaming device 112 (such as loyalty point initiation events and other gaming events), facilitate communications with players 124 via the gaming devices 112 *a, b,* . . . , and/or perform any other task in connection with games played by a player 124 at gaming devices.

It should be appreciated that the central gaming server 116 may or may not be co-located with the gaming devices 112. Thus, one or more gaming systems 112 may communicate with the gaming server 116 over a WAN, such as the Internet. In such an event, a tunneling protocol or Virtual Private Network may be established over some of the communication network 108 to ensure that communications between a gaming device 112 and a remotely-located gaming server 116 are secured.

FIG. 1 also depicts the possibility of some personal gaming mobile devices 114 (e.g., smart phones, tablet computers, etc.) being paired with a gaming device 112, thereby enabling communications to flow between the personal gaming mobile device on the one hand and the gaming device 112 on the other. This communication may utilize a proximity-based communication protocol, such as Bluetooth, BLE, NFC, WiFi, etc. One or more personal gaming devices of the player 124 may not necessarily be paired with a gaming device 112, but such personal gaming devices may still be configured to communicate with the central gaming server 116 via the communication network 108. Communications between the gaming device 112 and personal gaming mobile device may facilitate any number of combinations of gameplay opportunities.

The central gaming server 116 is in communication, via the gaming network 104, with one or more databases 184. The databases 184 may be configured to store one or multiple data structures (which can include the resort wallet 118, casino wallet 120, retail wallet 122, and sports/mobile wallet 126 and player engagement indicator sets) that are used in connection with interactive gaming activities of players 124 and the gaming system 100. The databases can use any database model and compatible database management system. Examples of database models include relational databases, object-oriented databases, and non-relational databases, such as NoSQL and NewSQL databases.

In various embodiments, a gaming establishment fund management function in the gaming server 116 that includes one or more cashless wagering systems that are each associated with or otherwise maintain one or more cashless wagering accounts. In certain embodiments, the gaming establishment fund management function includes a first cashless wagering system that maintains a first cashless wagering account, in which a player utilizes a mobile device application or app running on a mobile device to facilitate the electronic transfer of any funds between the first cashless wagering account and a gaming device 112. For example, as seen in FIG. 1, a resort wallet 118 or enterprise wallet includes or is otherwise in communication with a sports/mobile wallet 126 (i.e., a first cashless wagering account maintained by a first cashless wagering function) accessible via the mobile device 114 running a mobile device application as described herein.

In certain embodiments, the gaming establishment fund management system additionally or alternatively includes a second cashless wagering function that maintains a second cashless wagering account associated with a physical instrument, such as a player issued magnetic striped card. In these embodiments, a player utilizes the physical instrument (e.g., via inserting the card into a player tracking unit associated with a gaming device) to facilitate the electronic transfer of any funds between this second cashless wagering account and the gaming device. Continuing with the example, as seen in FIG. 1, the resort or enterprise wallet 118 also includes or is otherwise in communication with a casino wallet 120 (i.e., a second cashless wagering account maintained by a second cashless wagering function) accessible via a physical instrument, such as a player issued magnetic striped card associated with the second cashless wagering function or a mobile device 114 associated with the second cashless wagering function.

In various embodiments, in addition to or an alternative of maintaining one or more cashless wagering accounts via one or more cashless wagering functions, the gaming establishment fund management function includes one or more gaming establishment retail functions that each maintain one or more gaming establishment retail accounts. Such a gaming establishment retail account (i.e., a gaming establishment retail wallet 122) integrates with various retail point-of-sale systems throughout the gaming establishment to enable players to purchase goods and/or services via the player's gaming establishment retail account. Continuing with this example, as seen in FIG. 1, the resort or enterprise wallet 118 further includes or is otherwise in communication with the retail wallet 122 (i.e., a gaming establishment retail account maintained by a gaming establishment retail function) accessible via a point-of-sale terminal associated with a gaming establishment.

The gaming system 100 can include a patron manager 150 that manages the award of loyalty points and balance of players' loyalty points accounts. Typically, the patron manager 150 monitors gaming events of players on gaming devices 112a, b, . . . and changes in the balance of the resort wallet 118, casino wallet 120, retail wallet 122, and sports/mobile wallet 126, and other player transactions with the gaming establishing or casino and, applying promotional rules, increments or decrements a player's loyalty point balance in the resort wallet 118. In some embodiments, the patron manager owns the loyalty point balance. The loyalty point balance is not stored in the resort wallet 122.

The gaming system 100 can receive player engagement communications from the patron manager 150 to determine levels of player engagement and nonengagement for each player 124 having an account with the gaming system 100, whether or not the player 124 is currently engaged with, or logged into, the gaming system 100. Player engagement can take many forms including one or more of gaming events of players on gaming devices 112a, b, . . . (including game outcomes, play intensity, credit meter or wager credit balances, and the like) and changes in the balance of the resort wallet 118, casino wallet 120, retail wallet 122, and/or sports/mobile wallet 126, and other player transactions with the gaming establishing or casino. The types of player activities required to change a parameter value or state of a given player engagement indicator normally depends on the type of player engagement indicator and/or player tier. Stated differently, a first type of player engagement indicator for a first player tier has a different ruleset than for a different second player tier, and the first type of player engagement indicator has a different ruleset than a different second type of player engagement indicator. The objects in each ruleset are discussed below.

Figure 2:
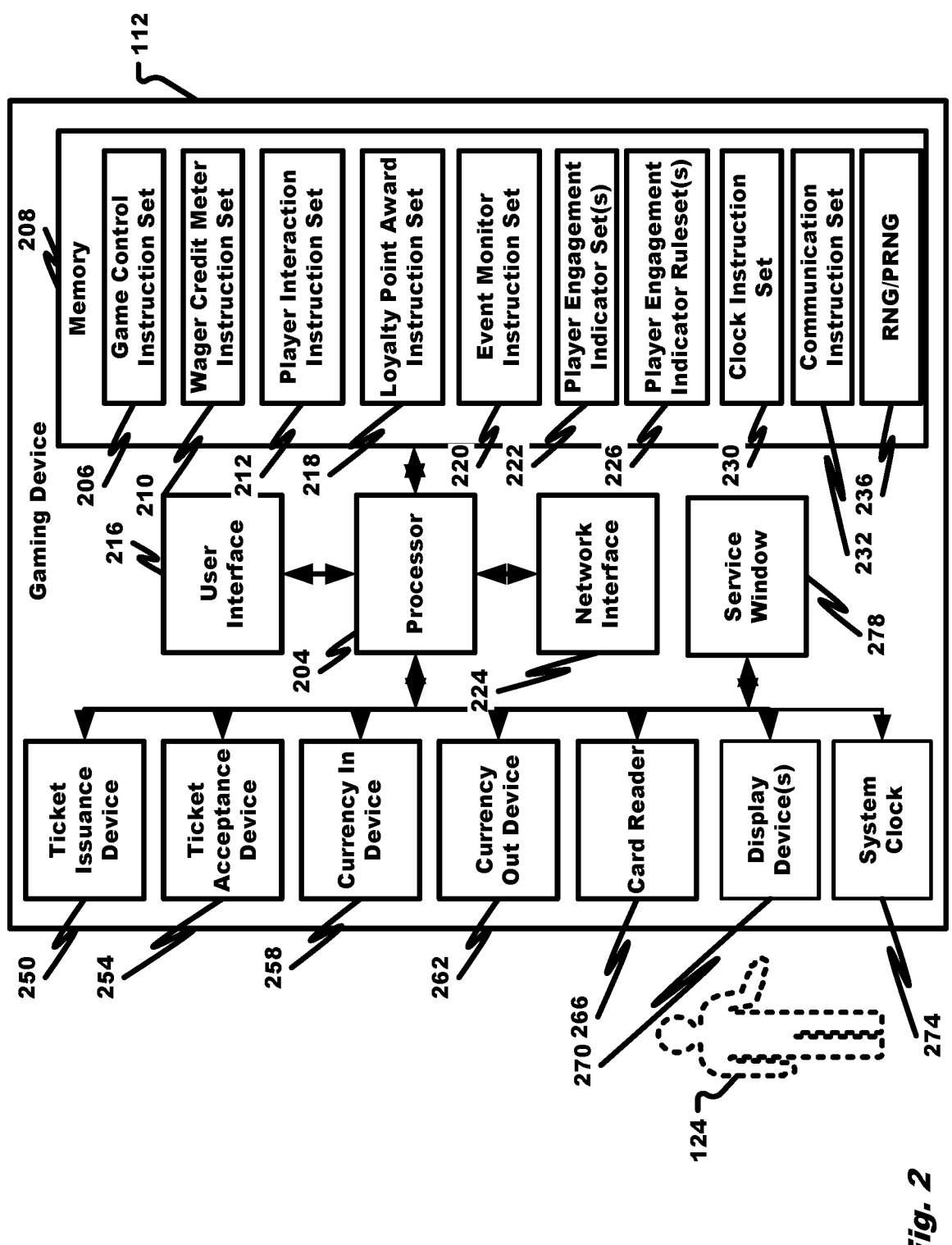
FIG. 2 is a block diagram depicting a gaming device in accordance with embodiments of the present disclosure.

With reference to FIG. 2, additional details of the components that may be included in a gaming device 112 will be described in accordance with at least some embodiments of the present disclosure.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 112 depicted herein may include a support structure, housing or cabinet, which provides support for a plurality of displays, inputs, controls and other features of a conventional gaming machine. In some embodiments, a player 124 plays gaming device 112 while sitting, however, the gaming device 112 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 112 can be constructed with varying cabinet and display configurations.

The gaming device 112 is shown to include a processor 204, memory 208, a network interface 224, and a user interface 216.

In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), or plurality of microprocessors that are configured to execute the instructions sets stored in memory 208. In some embodiments, the instruction sets stored in memory 208, when executed by the processor 204, may enable the gaming device 112 to provide game play functionality.

The nature of the network interface 224 may depend upon whether the network interface 224 is provided in cabinet- or player station-style gaming device 112 or a mobile gaming device 112. Examples of a suitable network interface 224 include, without limitation, an Ethernet port, a USB port, an RS-232 port, an RS-485 port, a NIC, an antenna, a driver circuit, a modulator/demodulator, etc. The network interface 224 may include one or multiple different network interfaces depending upon whether the gaming device 112 is connecting to a single gaming network 104 or multiple different types of gaming networks 104. For instance, the gaming device 112 may be provided with both a wired and wireless network interface 224 without departing from the scope of the present disclosure.

The user interface 216 may include a combination of user input devices and user output devices. For instance, the user interface 216 may include a display screen, speakers, buttons, levers, a touch-sensitive display, or any other device that is capable of enabling player 124 interaction with the gaming device 112. The user interface 216 may also include one or more drivers for the various hardware components that enable player 124 interaction with the gaming device 112.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a game control instruction set 206, wager credit meter instruction set 210, player interaction instruction set 212, loyalty point award instruction set 218, event monitor instruction set 220, player engagement indicator set(s) 222, player engagement indicator rulesets 226, clock instruction set 230, communication instruction set 232, and random number generator or pseudorandom number generator (collectively referenced as PRNG/RNG) 236 that is used by the game control instruction set 206, for example, to provide game outputs.

In some embodiments, the game control instruction set 206, when executed by the processor 204, may enable the gaming device 112 to facilitate one or more games with the player(s) 124. In some embodiments, the game control instruction set 264 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 112, 114 of other non-players or third parties, subroutines that create, maintain and update player profiles of the player(s) to the game, subroutines that generate, such as by PRNG/RNG 236, an outcome of the game, subroutines that alter, modify, or select game or display operations or functions in response to the player incentivization program, subroutines that calculate whether an outcome of the game has resulted in a win or loss during the game, subroutines for determining winnings and award payouts for the player(s) and others in the event of a win, subroutines for exchanging communications with another device, such as another gaming device 112 or gaming server 116, and any other subroutine useful in connection with facilitating game play at the gaming device 112.

The wager credit meter instruction set 210, when executed by the processor 204, may enable the gaming device 112 to facilitate a tracking of activity at the gaming system 100 for reporting to the gaming server 116 or patron manager 150. In some embodiments, the wager credit meter instruction set 210 may be used to store or log information related to various player 124 activities and events that occur at the gaming device 112. The types of information that may be maintained in the wager credit meter instruction set 210 include, without limitation, player information, available credit information, wager amount information, changes in wager credit meter balance as a function of time, and other types of information that may or may not need to be recorded for purposes of accounting for wagers placed at the gaming device 112 and payouts made for a player 124 during a game of chance or skill played at the gaming device 112. In some embodiments, the wager credit instruction set 210 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 112, and the like. In some embodiments, certain portions of the wager credit meter instruction set 210 may be updated in response to outcomes of a game of chance or skill played at the gaming device 112. In some embodiments, the gaming device 112 does not include a wager credit meter instruction set 210.

The player interaction instruction set 212 and event monitor instruction set 220, when executed by the processor 204, detect player activity at the gaming device 112 and notifies the gaming server 116 or patron manager 150 of an instance of detected player 124 interaction, a type of player

124 interaction detected, and a timestamp from a system clock and associated with the player 124 interaction and enable the gaming device 112 to monitor operations of components of the gaming system 100 in response to interaction with players. The player gaming server 116 can use this input from the gaming device to determine and update the parameter value of an engagement indicator and/or engagement indicator state. Types of player interaction with the gaming device 112 can comprise, for example, physical contact of an input of the gaming device by a player 124 and/or a current credit balance maintained by the credit meter instruction set 210 associated with the gaming device 112.

The loyalty point award instruction set 218, when executed by the processor 204, applies the promotional rules 222 to the monitored operations to reward loyalty points to eligible players. The loyalty point award instruction set 218 further causes the processor 204 to increment and decrement loyalty point award balances for eligible players. As noted, these functions can also be performed by the patron manager 150 independently of the gaming device or as part of the gaming server 116 as discussed below.

The player engagement indicator set(s) 222 represent the sets of player engagement indicators that are currently active for the player 124 associated with the gaming device 112. The membership sizes of the player engagement indicator set(s) can depend on a number of factors, including player tier, player loyalty points or funds transferred to the gaming system to acquire the player engagement indicator set, a gaming event or outcome for the player's gaming session on the gaming device 112, and the like. As noted, each set comprises a common type of player engagement indicator, each of which has a common parameter value or state. In some embodiments, each set is associated with a different physical or virtual object, such as a plot of land.

The player engagement indicator ruleset(s) 226, when executed by the processor 204, control creation, maintenance, restoration, and harvest of sets of player engagement indicators. While different sets of player engagement indicators can have a common ruleset, some embodiments use different rulesets for each set of indicators.

The creation, maintenance, restoration, and harvest of a particular set of engagement indicators can depend on a number of factors measured over a predetermined time period. For example, the availability of each activity (e.g., indicator parameter value or state) can depend on amount or intensity of game play, type or category of game played (e.g., slots, blackjack, keno, etc.), amount of money spent or bet on game play, occurrence of a series of events or transactions involving a selected player at the game establishment, occurrence of a predetermined game event or sequence of events during one or more games (e.g., occurrence of a lucky coin event), occurrence of a system event (an event that is independent of a particular player's game play but involving multiple gaming devices or players (e.g., the game establishment realizing a determined threshold of gaming activity throughout the gaming system, occurrence of a determined time of day or day of week, and the like), and/or occurrence of a random event generated by the PRNG/RNG 236 (e.g., output of a predetermined random number entitles all players of a selected rank or class (e.g., gold or silver players) but not players of another rank or class (e.g., silver) to receive and loyalty points). When random events are employed, a lookup table can map a predetermined event against a random or pseudorandom number or range of random or pseudorandom numbers. A given random or pseudorandom number therefore can yield a corresponding event.

In some embodiments, the state or parameter value of the player engagement indicator is/are determined by gaming events in a gaming session of the player. Returning to the farming example above, the crops might be grown or "watered" by triggering a free spin in a bonus game within the predetermined time period. Gaming events, the occurrence of which during the predetermined time period could plant, grow, maintain, or harvest the crops, could be one or more of: certain slot symbols landing; certain wins with certain slots symbols; dealing certain poker hand; playing certain game category; receiving certain non-winning combinations such as a near miss or certain type of loss; occurring of bonus trigger; occurring of free spin trigger; occurring of game specific event such as a multiplier growing or changing; playing a tournament event, and placing a sports wager, among others. In one embodiment, the player feeds the crops by hitting certain game events. For example, the crops are only maintained by hitting a flush in a video poker game.

In some embodiments, the opportunity to harvest or harvest completion is triggered by occurrence during the predetermined time period of a harvesting awards game element, such as wild cards, reel symbols, etc. as a game outcome in a gaming session of the player. The harvesting awards game elements that could be awarded are one or more of: wild card in a card game, certain card in a card game, random card in a card game, wild slot symbol, multiplier, free spin, extra slot reel, extra card in a card game, hold a reel or card, paytable change (better player return percentage), feature unlock (like a bonus), sports wager, and different sports wagering odds, among others. In one embodiment, the player must hit a certain win event during the predetermined time period to harvest the crops. For example, the player plants the crops but must hit a straight flush in the future to harvest them. In one embodiment, the crops could instantly be ready for harvest after being "planted" or created. For example, the player chooses to plant corn. Instead of having to wait for the corn to grow fully before being ready to harvest the game randomly (due to output of a random or pseudorandom number generator output) decides to award the future value instantly.

The processor 204 notifies the player 124 of the opportunity to create or harvest a set of player engagement indicators or a parameter value or state of the set of indicators, such as by sending a notification via a portable communication device of the player 124, rendering on a display or service window the award notification and activating lights and playing sounds to congratulate the player 124 for the award.

The clock instruction set 230, when executed by the processor 204, generates timestamps for player activities or engagement and periods of player nonengagement. For example, the clock instruction set 230 can cause the processor to measure a period of player engagement by generating a first timestamp when the player 124 logs on the gaming device 112 and second timestamp when the player 124 logs off the gaming device 112, with the difference between the second and first timestamps representing the period of player engagement. Additionally, the clock instruction set 230 can cause the processor to measure a period of player nonengagement by generating a third timestamp when the player 124 logs out of the gaming device 112 and fourth timestamp when the player 124 logs on the gaming device 112, with the difference between the fourth and third timestamps representing the period of player nonengagement.

The communication instruction set 232, when executed by the processor 204, may enable the gaming device 112 to communicate with the central gaming server 116 and/or a personal gaming device. In some embodiments, the communication instruction set 232 may include instructions that enable the gaming device 112 to pair with a personal gaming mobile device and establish a communication channel with the personal gaming mobile device via the pairing. As an example, the communication instruction set 232 may include instructions that enable NFC, Bluetooth®, Wi-Fi, or other types of communication protocols. It should be appreciated that the communication instruction set 232 may also be updated to reflect when a personal gaming mobile device is paired with the gaming device 112 and such pairing information may include addressing information for the personal gaming device and/or identification information associated with the player 124 of the personal gaming mobile device. Alternatively or additionally, the communication instruction set 232 may enable the gaming device 112 to identify a player 124 of the personal gaming device, identify a loyalty account associated with the player 124 of the personal gaming device, exchange information (e.g., send or receive) with a loyalty application operating on the personal gaming device, or combinations thereof. In some embodiments, the communication instruction set 232 may be configured to operate or drive the network interface 224 to facilitate direct or indirect communications with a personal gaming device.

While shown as separate instruction sets, it should be appreciated that any of the game control instruction set 206, wager credit meter instruction set 210, player interaction instruction set 212, loyalty point award instruction set 218, event monitor instruction set 220, player engagement indicator rulesets 226, and clock instruction set 230 may correspond to a subroutine of the game control instruction set 206 without departing from the scope of the present disclosure.

The gaming device 112 is further shown to include a ticket issuance device 250, a ticket acceptance device 254, a currency in device 258, a currency out device 262, and a card reader 266. The ticket issuance device 250 may be configured to print physical tickets, vouchers, or the like. The ticket acceptance device 254 may be configured to receive, scan, and/or recognize information from an input physical ticket, voucher, or cash. In some embodiments, the ticket issuance device 250 and ticket acceptance device 254 may operate in concert with a common piece of hardware that both accepts and produces physical tickets, vouchers, or the like. Tickets or vouchers printed by ticket issuance device 250 and recognizable by the ticket acceptance device 254 may correspond to physical lottery tickets, casino vouchers, paper coupons, and the like. Alternatively or additionally, the ticket issuance device 250 and/or ticket acceptance device 254 may be connected to ticket or cash reading hardware. In such an embodiment, the ticket issuance device 250 and ticket acceptance device 254 may operate as a driver and/or firmware component for the card reader.

Similarly, the currency in device 258 and currency out device 262 may include or operate in concert with a coin slot or any other type of coin delivery mechanism. The currency in device 258 and currency out device 262 may include hardware, drivers, or firmware that facilitate receiving or distributing tokens, coins, chips, etc. In some embodiments, the currency in device 258 may be configured to determine an amount of coins (an amount of tokens, an amount of chips, etc.), input at the coin slot and convert the values into credits for playing games. The currency out device 262 may correspond to hardware and software configured to output coins, tokens, chips, etc. if a player decides to cash out or convert playing credits back into coins, tokens, or chips, etc.

The card reader 266 may include hardware and/or software configured to read or accept any type of card, or portable credential (e.g., NFC, Bluetooth, Wi-Fi, etc.). In some embodiments, the card reader 266 may include hardware and/or software that enable contactless reading of a card, token, or portable credential. In some embodiments, the card reader 266 may include hardware and/or software that enable contact-based reading of a card, token, or portable credential (e.g., magstripe, chip reader, electrodes, card-receiving slot, etc.). It should be appreciated that the card reader 266 may be configured to receive and reader a card or portable credential, token, in any type of format (e.g., portable plastic card, magstripe card, key fob, etc.). It should also be appreciated that the card reader 266 may be configured to write information or data onto a card or portable credential. Furthermore, in some embodiments, the card reader 266 may be configured to read a player loyalty card in the form of a plastic credit-card shaped credential. In some embodiments, the card reader 266 may enable communications with a loyalty application operating on a player's personal gaming device.

The gaming device 112 may include one or more display devices 270 configured to render information, live video, communications windows, wagering interface windows, games, interactive elements, and/or other visual output to one or more display screens. The gaming device 112 may include one or more display controllers configured to control an operation of the display device 270. This operation may include the control of input (e.g., player input via the user interface 216, command input via the instruction sets in memory 208, combinations thereof, etc.), output (e.g., display, rendered images, visual game behavior, etc.) and/or other functions of the display device 270.

In an embodiment, the display device 270 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display.

In an embodiment, the display device 270 comprises one or more projectors to project virtual reality or augmented reality images during the escape room game. The projector(s) can be any projecting device that can project a computer image onto a projection augmented model (PA model) and/or a spatially augmented reality (SAR) model to provide the players 124 with augmented reality, augmented virtuality, and/or virtual reality computer-generated game environments. As will be appreciated, projection mapping, video mapping or SAR typically uses one or more optical devices or projectors that project a beam of light onto a selected escape room space to provide the player with the augmented reality, augmented virtuality, and/or virtual reality computer-generated game environments.

In an embodiment, the display device 270 comprises head-mounted displays worn by the players 124 to view the augmented reality, augmented virtuality, or virtual reality computer-generated game environments.

The display device 270 may include a display driver, a power supply, an input/output, and/or other components configured to enable operation of the display device 270. The display driver may receive commands and/or other data provided by the processor 204 and one or more of the instruction sets in memory 208. In response to receiving the commands, the display driver may be configured to generate the driving signals necessary to render the appropriate images to the display screen. The power supply may provide electric power to the components of the display device 270. In some embodiments, the power supply may include a transformer and/or other electronics that prevent overloading, condition power signals, and/or provide backup power to the display device 270. The input/output may correspond to one or more connections for receiving or exchanging information and/or video from components of the gaming device 112. The input/output may include an interconnection to the network interface 224. By way of non-limiting example, the input/output may include a high-definition multimedia interface (HDMI) input, Ethernet, composite video, component video, H.264, or other video connection.

The gaming device 112 can further include a system clock 270 for timestamp creation. The system clock can be implemented in hardware (e.g., a quartz crystal oscillator) or software that generates and sends out a timing signal on a regular or periodic basis to all other computer components of the gaming device 112 to synchronize the various components operations. In some embodiments, the gaming device 112 comprises both a hardware clock known as the Real Time Clock and a software clock.

In some embodiments, the gaming device comprises a service window 278 that exchanges electronic messages with the gaming server 116 and controls one or more of the display device(s) 270.

Figure 3:
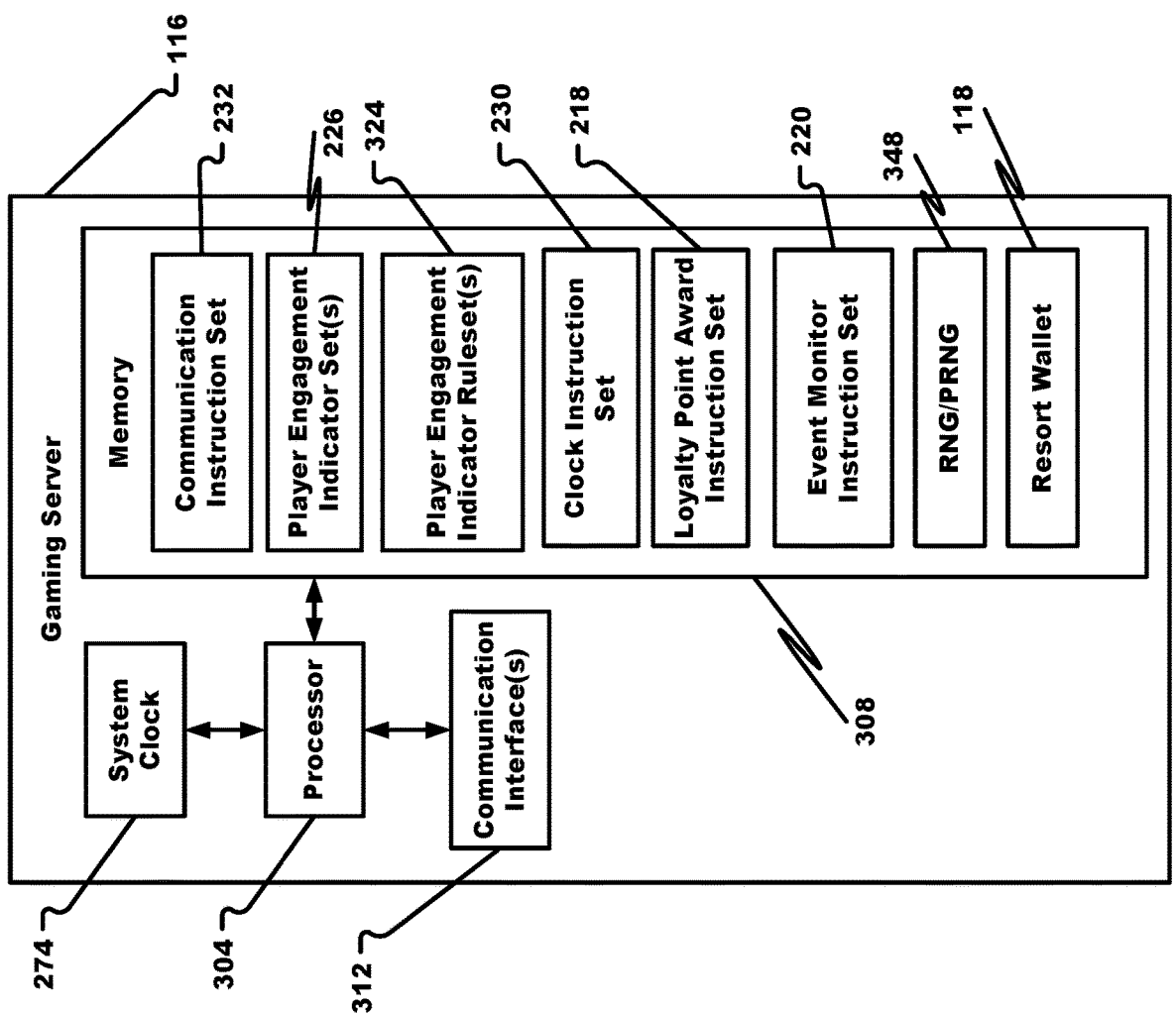
FIG. 3 is a block diagram depicting a gaming server in accordance with embodiments of the present disclosure.

With reference now to FIG. 3, additional details of a gaming server 116 will be described in accordance with embodiments of the present disclosure. The gaming server 116 is shown to include a processor 304, memory 308, and a plurality of communication interfaces 312. These resources may enable functionality of the gaming server 116 as will be described herein. For instance, a communication interface 312 may provide the gaming server 116 with the ability to send and receive communication packets or the like over the gaming network 104. The communication interface 312 can also facilitate communications with the mobile devices 114 via the communication network 108. The communication interface 312 may be provided as a network interface card (NIC), a network port, drivers for the same, and the like. Communications between the components of the gaming server 116 and other devices connected to the gaming network 104 may all flow through the communication interface 312.

The processor 304 may correspond to one or many computer processing devices. The processor 304 may be configured to execute one or more instruction sets stored in memory 308. Upon executing the instruction sets stored in memory 308, the processor 304 enables various authentication functions of the gaming server 116.

The memory 308 may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EEPROM), Dynamic RAM (DRAM), etc.

The illustrative instruction sets that may be stored in memory 308 include, without limitation, the communication instruction set 222, the player engagement indicator set(s) 222 for the various players 124 having accounts on the gaming system 100, the player engagement indicator ruleset(s) 226, the clock instruction set 230, the loyalty point award instruction set 218, event monitor instruction set 220, RNG/PRNG 348, and resort wallet 118. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein. Although not depicted, the gaming server 116 may include instructions that enable a processor to store data into the database 184 and retrieve information from the database 184. Alternatively or additionally, the database 184 or data stored therein may be stored internal to the gaming server 116 (e.g., within the memory of the server 116 rather than in a separate database).

The random number generator or pseudorandom number generator (RNG/PRNG) 348, like the PRNG/RNG 236, is used to generate a random event as noted above. The RNG/PRNG 348 generates a distribution of numbers or game symbols (the random number value) that are not reasonably predictable by a random chance. Random number generators can be truly random hardware random generators (HRNGS), which generate random numbers as a function of current value of some physical environment attribute that is constantly changing in a manner that is practically impossible to model, or pseudo-random number generators (PRNGs), which generate numbers that look random, but are actually deterministic, and can be reproduced if the state of the PRNG were known. In some applications, the RNG/PRNG 348 uses computational algorithms that can produce long sequences of apparently random results, which are in fact determined by a shorter initial value, known as a seed value or key.

In one embodiment, the RNG/PRNG 348 is a PRNG, which constantly generates a sequence of simulated random numbers, at a rate of hundreds or perhaps thousands per second. As soon as a "play" button is pressed or other game initiation is received from the player or a predetermined event occurs, the most recent random number is used to determine the result. This means that the result varies depending on exactly when the game is played. In other embodiments, the RNG/PRNG 348 is a cryptographic random number generator.

In some embodiments, the resort wallet 118 comprises a cash wallet set of data structures 356 that tracks a cash balance not only collectively for the gaming system 100 but also individually for each player's account managed by the gaming system 100. When cash is moved from a central resort wallet to a player's wallet, the appropriate data structures in each set of data structures are updated to reflect the transfer.

Figure 4:
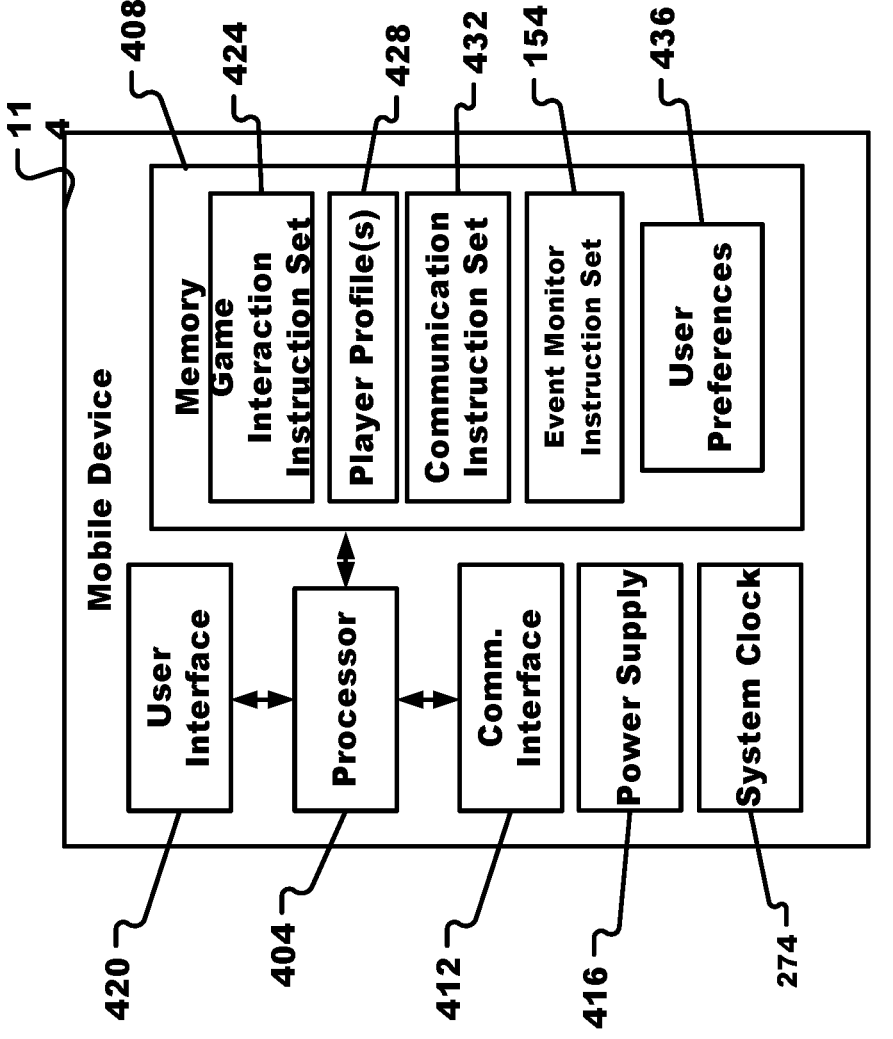
FIG. 4 is a block diagram depicting a mobile device in accordance with embodiments of the present disclosure.

With reference now to FIG. 4, additional details of the components that may be included in a mobile device 114 will be described in accordance with at least some embodiments of the present disclosure. The mobile device 114 is shown to include a processor 404, memory 408, a communication interface 412, and a user interface 420. In some embodiments, the processor 404 may be similar or identical to any of the other processors 204, 304 depicted and described herein and may correspond to one or many microprocessors, CPUs, microcontrollers, Integrated Circuit (IC) chips, or the like. The processor 404 may be configured to execute one or more instruction sets stored in memory 408. In some embodiments, the instruction sets stored in memory 408, when executed by the processor 404, may enable the mobile device 114 to provide game play functionality, interact with gaming machines 112, pair with gaming machines 112, or any other type of desired functionality.

The communication interface 412 may be similar or identical to the network interface 224 and/or communication interfaces 312 depicted and described herein. The nature of the communication interface 412 may depend upon the type of communication network 108 for which the mobile device 114 is configured. Examples of a suitable communication interfaces 412 include, without limitation, a WiFi antenna and driver circuit, a Bluetooth antenna and driver circuit, a cellular communication antenna and driver circuit, a modulator/demodulator, etc. The communication interface 412 may include one or multiple different network interfaces depending upon whether the mobile device 114 is connecting to a single communication network 108 or multiple different types of communication networks. For instance, the mobile device 114 may be provided with both a wired communication interface 412 and a wireless communication interface 412 without departing from the scope of the present disclosure.

The user interface 420 may include a combination of a user input and user output device. For instance, the user interface 420 may include a display device, a microphone, a speaker, a haptic feedback device, a light, a touch-sensitive display, a button, or a combination thereof. The user interface 420 may also include one or more drivers for the various hardware components that enable user interaction with the mobile device 114.

The memory 408 may be similar or identical to other memory 208, 308 depicted and described herein and may include one or multiple computer memory devices that are volatile or non-volatile. The memory 408 may be configured to store instruction sets that enable player interaction with the mobile device 114 and that enable game play at the mobile device 114. Examples of instruction sets that may be stored in the memory 408 include a game interaction instruction set 424, player profile(s) 428, event monitor instruction set 220, user preferences 436, and a communication instruction set 432. In addition to the instruction sets, the memory 408 may also be configured to store data that is useable by the various instruction sets.

In some embodiments, the game interaction instruction set 424, when executed by the processor 404, may enable the mobile device 114 to facilitate one or more games of chance or skill and management of one or more player engagement indicator sets.

The player profile(s) 428 include a variety of player-specific data structures including player identification and login credentials.

The communication instruction set 432, when executed by the processor 404, may enable the mobile device 114 to communicate via the communication network 108. In some embodiments, the communication instruction set 432 may be similar or identical to the communication instruction set 232 and may be particular to the type of communication network 108 used by the mobile device 114. As an example, the communication instruction set 432 may be configured to enable cellular, WiFi, and/or Bluetooth communications with other devices. The communication instruction set 432 may follow predefined communication protocols and, in some embodiments, may enable the mobile device 114 to remain paired with a gaming machine 112 as long as the mobile device 114 is within a predetermined proximity (e.g., 20-30 feet, an NFC communication range, or a Bluetooth communication range) and paired with the gaming machine 112. In some embodiments, the communication instruction set 432 enables a mobile device application of the mobile device to negotiate a secure, authenticated connection with the proper functionality, versions and security settings.

The user preferences 436 may correspond to gaming or wager or player engagement indicator preferences that are desired by the player 124 of the mobile device 114. In some embodiments, the user preferences 436 may comprise player engagement indicator type-dependent events that may automatically trigger a request to participate in or otherwise manage one or more sets of player engagement indicators.

The mobile device 114 is also shown to include a power supply 416. The power supply 416 may correspond to an internal power supply that provides AC and/or DC power to components of the mobile device 114. In some embodiments, the power supply 416 may correspond to one or multiple batteries. Alternatively or additionally, the power supply 416 may include a power adapter that converts AC power into DC power for direct application to components of the mobile device 114, for charging a battery, for charging a capacitor, or a combination thereof.

Figure 5:
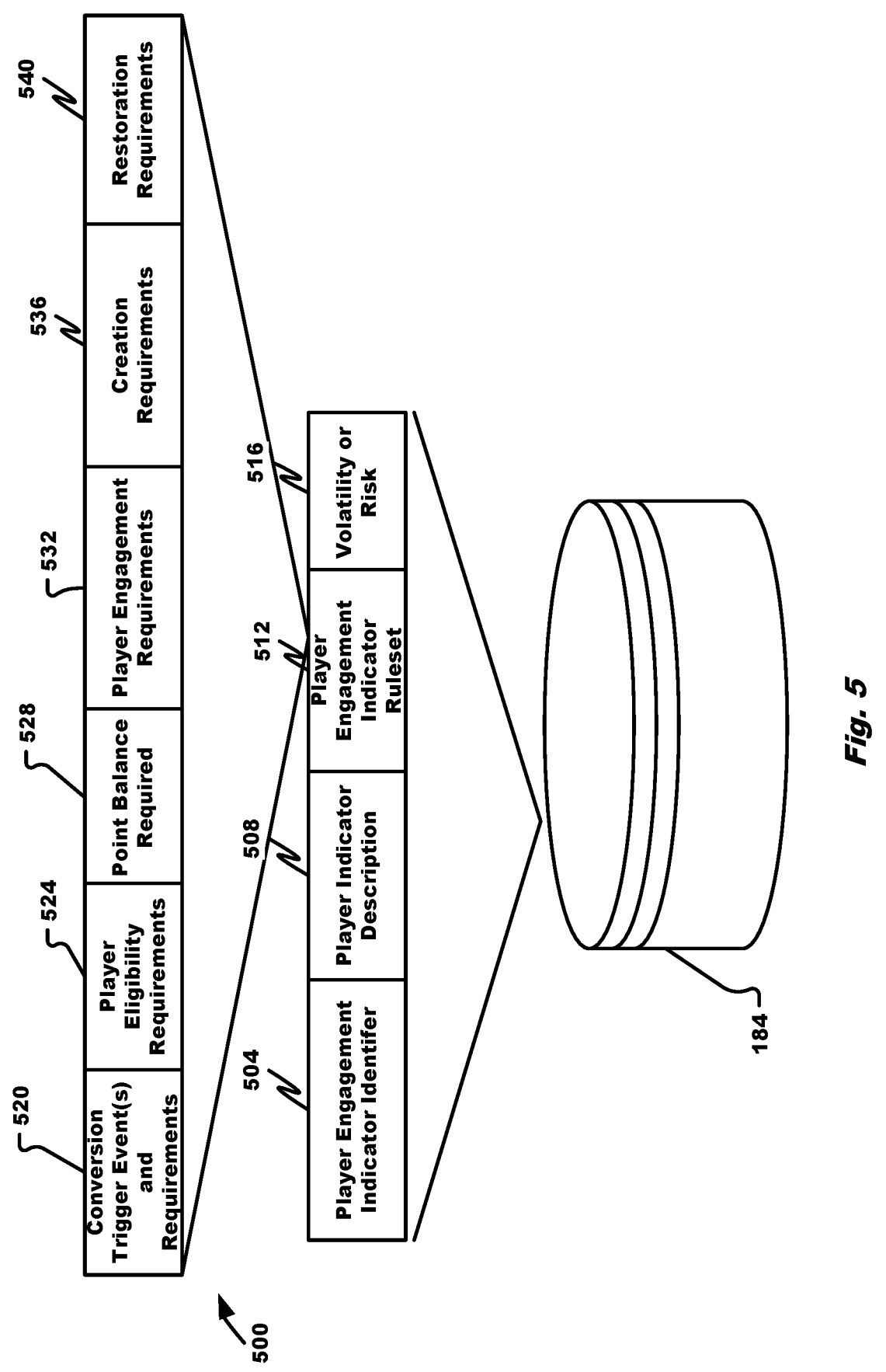
FIG. 5 is an illustrative data structure used in a player incentive award feature in accordance with embodiments of the present disclosure.

With reference now to FIG. 5, additional details of data that may be stored in the database 184 will be described in accordance with at least some embodiments of the present disclosure. The database 184 may be configured to store one or multiple data structures 500 that are used in connection with the various types of player engagement indicators employed by the gaming system 100. In some embodiments, the data stored in the data structures 500 may be stored for a plurality of different player engagement indicator types or for a single player engagement indicator type. The data structures 500 may include a plurality of data fields that include, for instance, a player engagement indicator identifier 504, player indicator description 508, volatility or risk 516, and player engagement indicator ruleset 512.

The player engagement indicator identifier field 504 may be used to store any type of information that identifies a player engagement indicator. In some embodiments, the player engagement indicator identifier field 504 stores one or more of player engagement indicator name information for the player engagement indicator and a corresponding unique identifier for the player engagement indicator relative to player engagement indicator identifier field values for other player engagement indicators.

Figure 8:
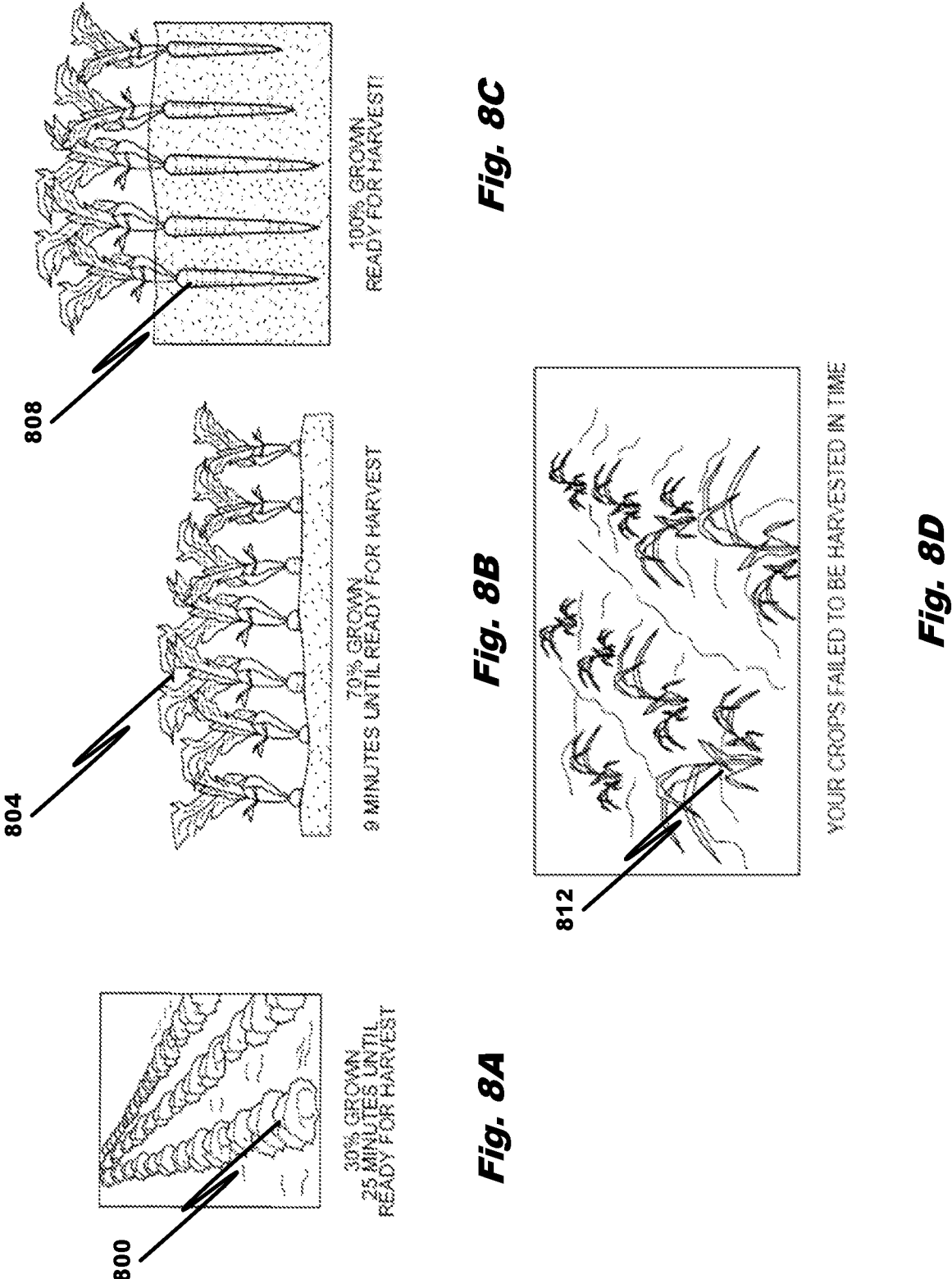
FIG. 8A is a screenshot of a player engagement indicator having a first state in accordance with embodiments of the present disclosure.
FIG. 8B is a screenshot of a player engagement indicator having a second state in accordance with embodiments of the present disclosure.
FIG. 8C is a screenshot of a player engagement indicator having a third state in accordance with embodiments of the present disclosure.
FIG. 8D is a screenshot of a player engagement indicator having a fourth state in accordance with embodiments of the present disclosure.

The player indicator description field 508 may be used to store descriptions of the corresponding player indicator, including a virtual or real spatial or geographical location associated with the indicator, planting, growing, and harvesting season associated with the indicator, optimal weather and soil conditions for growth, pest and disease risk associated with the indicator, associated graphical icons for displaying different parameter values or states of the corresponding player engagement indicator (e.g., planted, maintained, withered, and ready for harvest). Exemplary graphical icons are shown in FIG. 8A (for "planted" or recently created player engagement indicators showing the player engagement indicators 800 30% grown and 25 minutes until ready for harvest), 8B (for properly maintained player engagement indicators showing the player engagement indicators 804 70% grown and 9 minutes until ready for harvest), 8C (for player engagement indicators ready for harvest showing the player engagement indicators 808 100% grown and ready for harvest), and 8D (for player engagement indicators that are withered showing the player engagement indicators 812 withered as failed to be harvested in time).

The player engagement indicator ruleset field 512 describes rules governing the player eligibility, creation, maintenance, restoration, and harvest requirements for the corresponding player engagement indicator. Examples of data stored in the field 512 include conversion or harvest trigger event(s) and requirements field 520, player eligibility requirements field 524, point balance required field 528, player engagement or maintenance requirements field 532, creation requirements field 536, and restoration requirements field 540.

The conversion trigger event(s) and requirements field 520 can take many different forms depending on the corresponding player engagement indicator. Conversion triggers or ready for conversion triggers can occur when a parameter value of the corresponding player engagement indicator is at least a threshold level, a state of the corresponding player engagement indicator is a selected state, an amount or intensity of game play is at least a threshold amount or intensity, an amount of money spent or bet on game play is at least a thresholds amount, an occurrence of a series of events or transactions involving a selected player at the game establishment, an occurrence of a predetermined game event or sequence of events during one or more games (e.g., occurrence of a lucky coin event) in a gaming session involving the player 124, an occurrence of a system event (an event that is independent of a particular player's game play but involving multiple gaming devices or players, and/or an occurrence of a random event generated by the PRNG/RNG 236 (e.g., output of a predetermined random number causes the player engagement indicator to be ready to harvest or is harvested). In some embodiments, the player 124 has a specified time in which to harvest or convert the corresponding player engagement indicator into the corresponding award. If the player fails to complete the conversion within a specified time period of a ready for harvest timestamp, the amount of the corresponding award can be reduced or lost completely, the parameter value of the player engagement indicator changed to a different value, or the state of the player engagement indicator changed to a different state, such as properly maintained or withered.

In the farming example set forth above, exemplary data rules in the conversion trigger event(s) and requirements field 520 are as follows: for each of the crop types of carrots and radishes, the harvest time interval is xxxx minutes; if the player does not harvest the crop within the harvest time interval, the crop state will convert to withered and, if a player successfully harvests the crop within the harvest time interval, the crop value is yyyy (which can be either a monetary award or nonmonetary award such as loyalty or social network or media points, comps, etc.).

The player eligibility requirements field 524 and/or point balance required field 528 can include prerequisites for a player 124 to be eligible to acquire the corresponding player engagement indicators. Exemplary requirements include a tier or class of the player 124, a wallet account or wager credit or loyalty or social network or media point balance of the player being at least a predetermined threshold amount, and the like.

The player engagement requirements field 532, creation requirements field 536, and restoration requirements field

540 set forth types and levels of player activities required to properly maintain and grow, create or plant, and restore the corresponding player engagement indicator. For example, the corresponding parameter value or state for each activity can depend on amount or intensity of game play, type of game played (e.g., slots, blackjack, keno, etc.), amount of money spent or bet on game play, occurrence of a series of events or transactions involving a selected player at the game establishment, occurrence of a predetermined game event or sequence of events during one or more games (e.g., occurrence of a lucky coin event), occurrence of a system event (an event that is independent of a particular player's game play but involving multiple gaming devices or players (e.g., the game establishment realizing a determined threshold of gaming activity throughout the gaming system, occurrence of a determined time of day or day of week, and the like), and/or occurrence of a random event generated by the PRNG/RNG 236 (e.g., output of a predetermined random number causes the player engagement indicator to be created, properly maintained, or restored).

By way of example, the amount of time for the crops to "grow" or for grown crops to be harvested is determined by player loyalty account status or level or intensity of play. For example, for a given crop type a first player has a first level or intensity of play over a selected time period after "planting" of the crops and a second player has a second level or intensity of play over the selected time period. The amounts of time for each player to grow his or her crops to the ready to harvest state or to harvest his or her crops after the ready to harvest state is assigned are different due to the differing levels or intensities of play.

Figure 9:
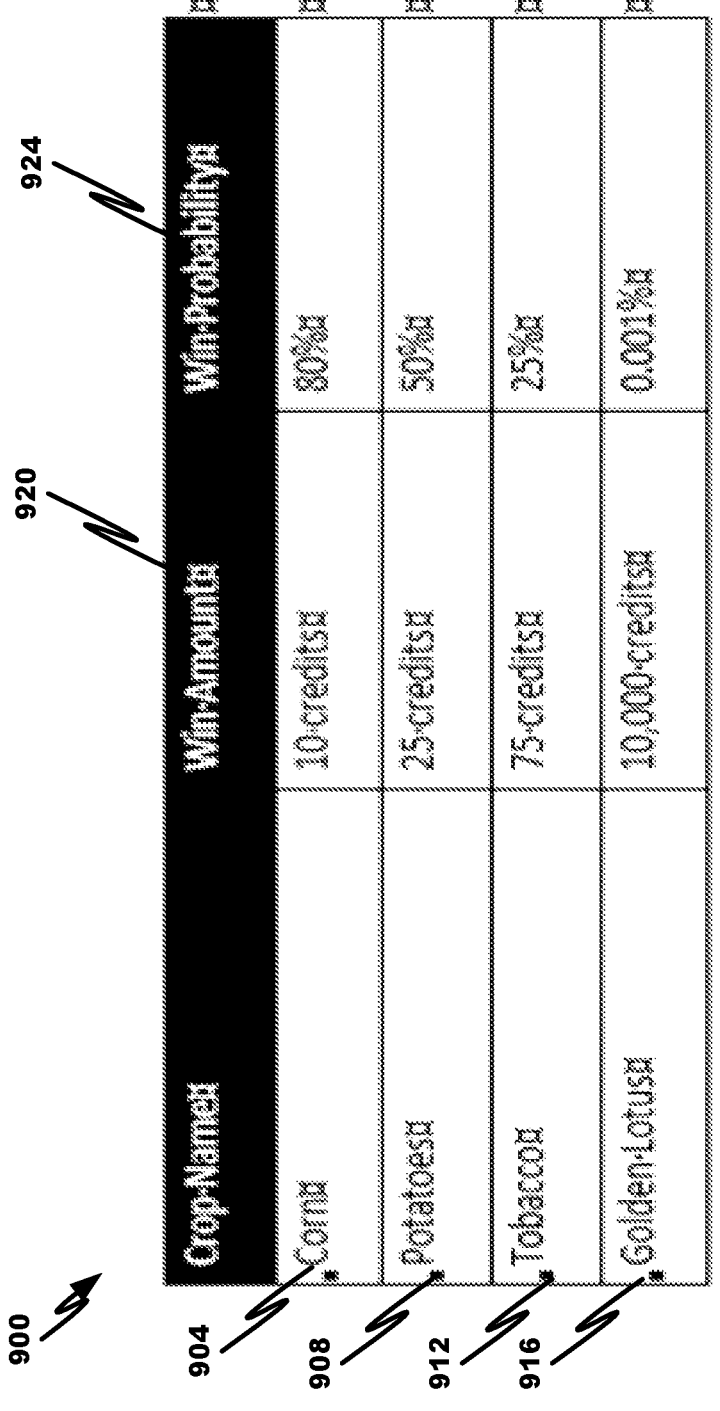
FIG. 9 is a screenshot of a pay table in accordance with embodiments of the present disclosure.

The volatility or risk field 516 correlates an award amount with a level of risk or win/loss probability. FIG. 9 depicts an exemplary table 900 comprising the volatility or risk field values for different types of player engagement indicators. The table 900 lists each different type of player engagement indicator (e.g., corn 904, potatoes 908, tobacco 912, and golden lotus 916) and the corresponding win amount 920 and win probability 924. As can be seen in table 900, each different type of player engagement indicator has a different win amount and win probability. In one embodiment, the player is allowed to choose their game volatility through the selection of crop type while in other embodiments, the gaming system 100 selects the crop type automatically without player input. By giving the player the choice of crops, the player can choose their risk tolerance.

In yet other embodiments, crop types can be unlocked. For example, the golden lotus 916 crop type above might only be available to players at a certain tier level or class or players who have acquired a certain gaming outcome or achievement, such as a lucky coin outcome.

In yet other embodiments, the types of crops available for player selection depend upon the player's loyalty or social network or media account status or a certain level or intensity of play, such as playing $5000 in an hour of gaming. For example, a first player has a first level or intensity of play over a selected time period and a second player has a second level or intensity of play over the selected time period. The types of crops available for selection by the first and second players are different due to the differing levels or intensities of play.

In one embodiment, the player does not choose the player engagement indicator, rather the type of player engagement indicator is determined by the game win event. For example, the player hits three cherries and that automatically plants corn while four cherries could plant tobacco.

In one embodiment, the award value of the player engagement indicator changes over the life of the indicator. For example, a selected crop has a first award value at a first time and a second award value at a later second time. The first award value can be less or more than the second award value. By way of illustration, the initial award value of the crop is zero and the crop only has an award value at a future time.

Figure 6A:
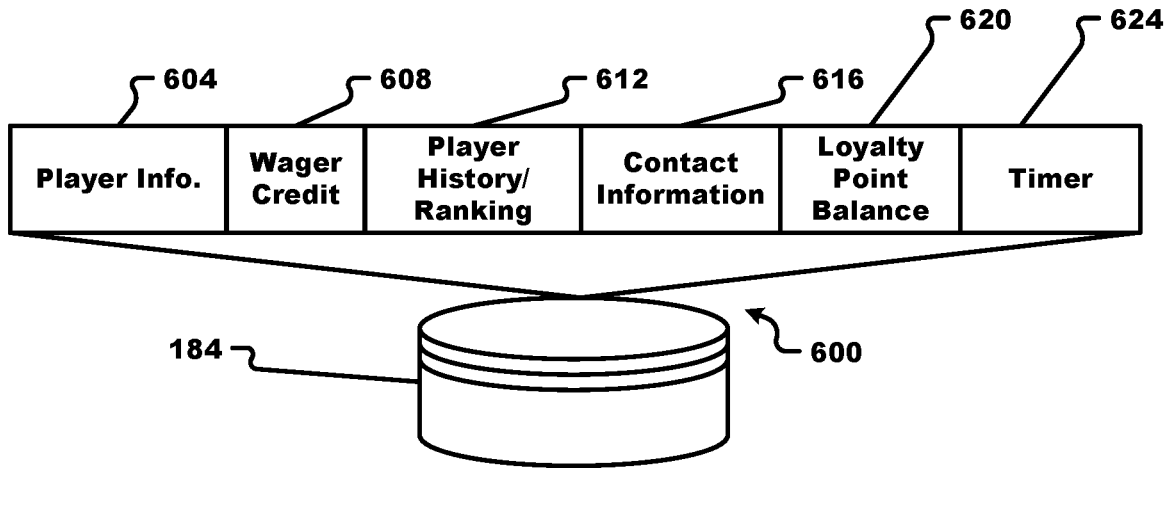
FIG. 6A is an illustrative data structure used in a player profile in accordance with embodiments of the present disclosure.

With reference now to FIG. 6A, additional details of data that may be stored in the database 184 will be described in accordance with at least some embodiments of the present disclosure. The database 184 may be configured to store one or multiple data structures 600 that are used in connection with gaming activities of a player. In some embodiments, the data stored in the data structures 600 may be stored for a plurality of different player profiles or for a single player profile. The data structure 600 may include a plurality of data fields that include, for instance, a player information field 604, a wager credit field 608, player history/ranking field 612, contact information field 616, loyalty points balance field 620, a timer field 620, and a timer field 624.

The player information field 604 and contact information field 616 may be used to store any type of information that identifies a player. In some embodiments, the player information field 604 may store one or more of username information for a player 124, contact information for the player (such as email address, phone number, social website webpage universal resource locator, and the like), password information for a player account, player status information, accommodations associated with the player 124, and any other type of customer service management data that may be stored with respect to a player 124.

The wager credit field 608 may be used to store data about a player's 124 available credit with the casino or a plurality of casinos. For instance, the wager credit field 608 may store an electronic record of available credit in the player's account and whether any restrictions are associated with such credit. The wager credit field 608 may further store information describing a player's available credit over time, wagers made over time, cash out events for the player, winning events for the player, and the like.

The player history/ranking 616 may be used to store information describing awards that have been paid to the player 124 or that are available to be paid in response to particular events occurring within the gaming system 100. As a non-limiting example, the player history/ranking 616 may be used to store electronic records for values of awards that are available to or have been paid to the player 124. The field 616 may be used to store a player ranking associated with the corresponding player 124. Player ranking may be measured in various ways. In one embodiment, the player ranking is based on membership in a platinum, gold, silver, or bronze class, with platinum being the highest value to the casino and bronze the lowest. In one embodiment, the player ranking is based on a proficiency level or performance rank in one or more gaming sessions. Other player loyalty classification schemes are possible depending on the application.

The player history/ranking field 616 may also store data related to awards, bonuses, mini bonuses, jackpots, side bets, etc. granted to the player 124. The field 616 may also indicate when such awards were granted to the player 124, whether the awards have been redeemed, whether the awards are being funded by a game of chance or skill, a mini bonus associated with an event, or a side bet award associated with the occurrence or nonoccurrence of an event.

The loyalty points balance field 620 may be used to store current loyalty point balances by type of loyalty points for the corresponding player 124. The field 620 is incremented and decremented as loyalty points are added to and removed from the player's loyalty account.

The timer field 624 may be used to store a timer value associated with the time period of player engagement or nonengagement and associated with tracking whether or not a particular player 124 or the gaming system 100 has completed a particular event or a plurality of events within a predetermined amount of time. By way of example, the timer field value may be used to store a player engagement period that determines whether the player 124 has completed the engagement requirements for maintaining, harvesting, or restoring a player engagement indicator or a player nonengagement period that determines a current parameter value or state of the player engagement indicator. The value of the timer within the timer field 620 may count up, count down, or increment in any known way to track a passage of time. Alternatively or additionally, time may be measured by an occurrence of events within the gaming system 100 rather than being measured absolutely.

Figure 6B:
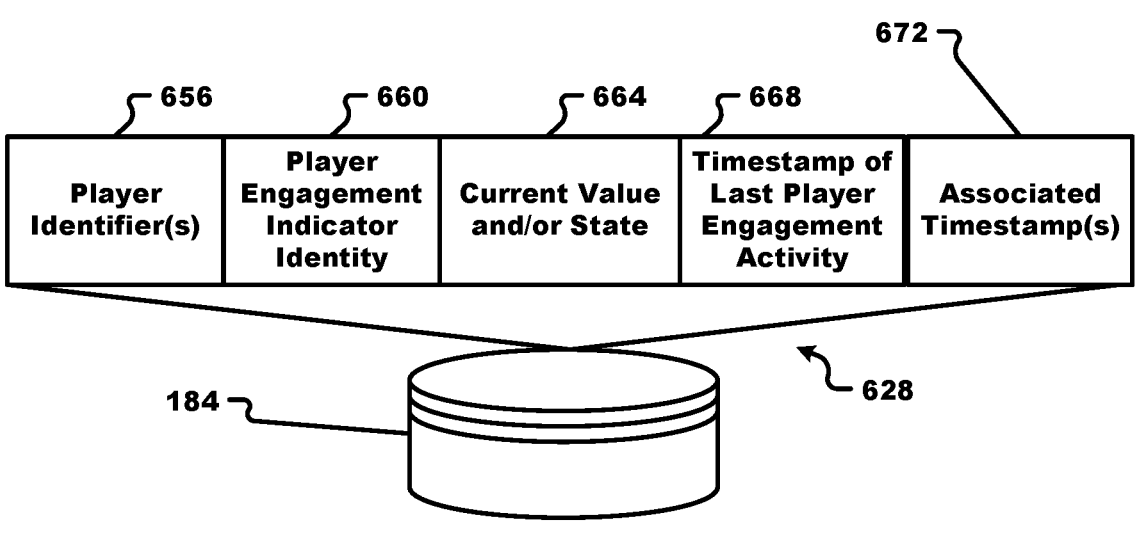
FIG. 6B is an illustrative data structure used in a player wagering account in accordance with embodiments of the present disclosure.

With reference now to FIG. 6B, additional details of data that may be stored in the database 184 will be described in accordance with at least some embodiments of the present disclosure. The database 184 may be configured to store one or multiple data structures 628 that are used in connection with the player engagement indicators of a corresponding player. The data structure 628 may include a plurality of data fields that include, for instance, a player identifier field 656 identifying the corresponding player, a player engagement indicator identity field 660 identifying the sets of player engagement indicators currently active for the identified player, a current value and/or state field 664 identifying a current value or state for each set of player engagement indicators, a timestamp of last player engagement field 668 identifying a timestamp of last player engagement activity with the gaming system 100, and an associated timestamp(s) field 672 for a current parameter value or state for each active set of player engagement indicators. The associated timestamp(s) field, for example, comprises a first timestamp for a first set of player engagement indicators that indicates when a current parameter value or state (e.g., maintained, withered, ready for harvest, or harvest completion) expires or is changed to a different parameter or value or state unless the player complies with appropriate engagement requirements and a different second timestamp for a second set of player engagement indicators indicating when the current parameter value or state expires or is changed to a different parameter or value, and so on. By way of example, the field 672 can store timestamp associated with past, current or future events, such as indicator set creation, indicator set maintenance activities, indicator set restoration completion, indicator set ready to harvest, indicator set harvest completion, minimum or maximum time to create, maintain, restore, ready to harvest, or harvest activities and the like.

Figure 12:
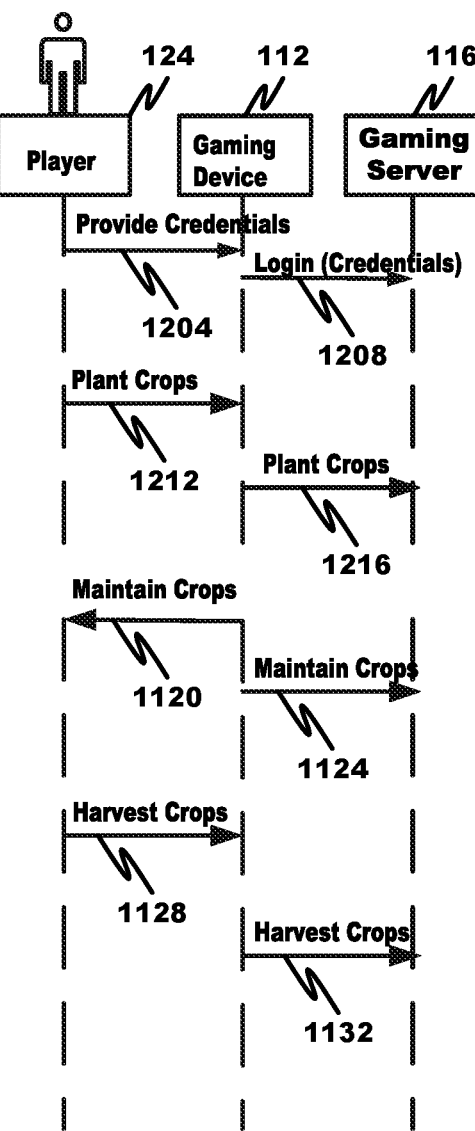
FIG. 12 is a picket fence diagram depicting a method of creating and managing sets of player engagement indicators in accordance with embodiments of the present disclosure.
Figure 13:
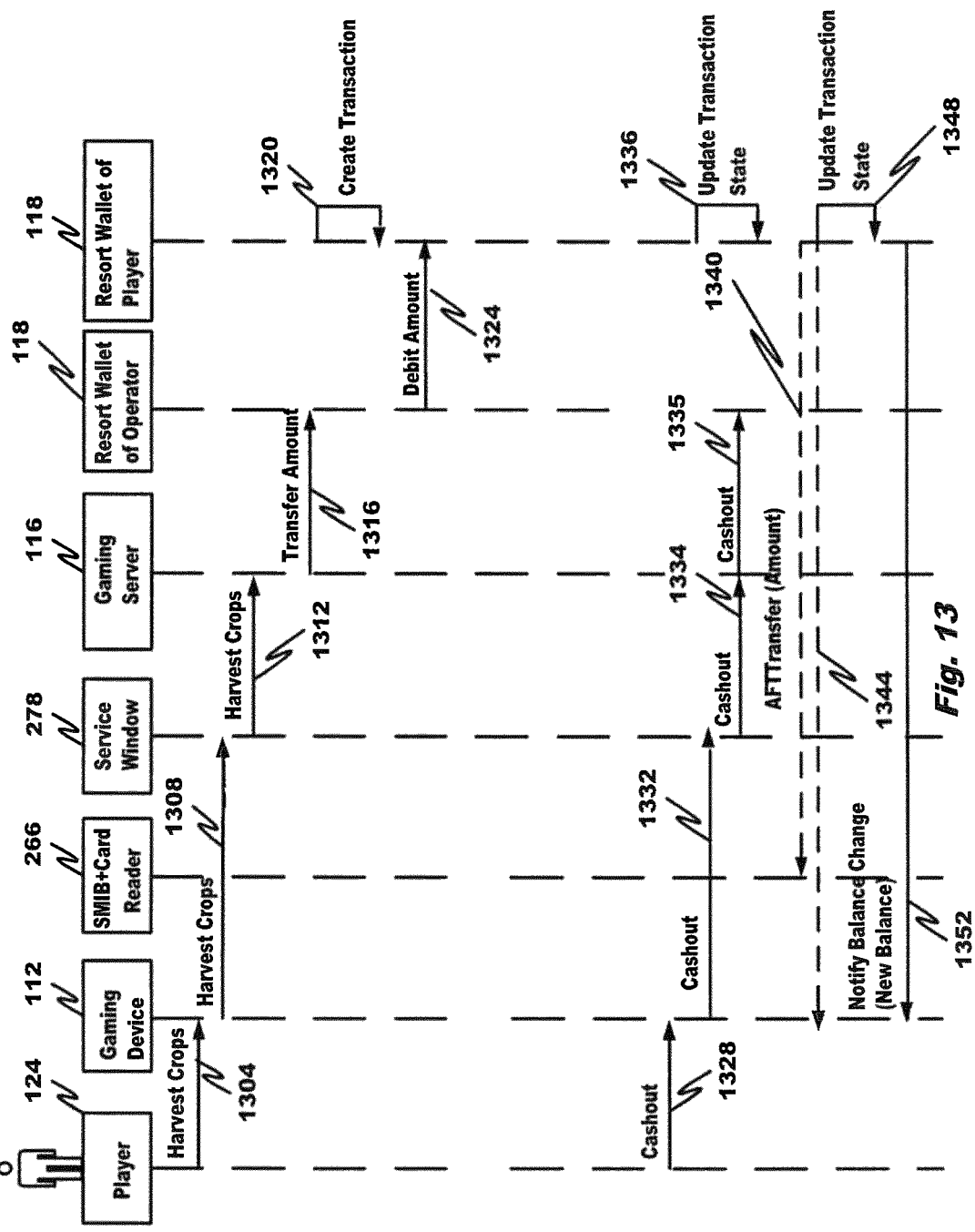
FIG. 13 is a picket fence diagram depicting a method of creating and managing sets of player engagement indicators in accordance with embodiments of the present disclosure.

FIGS. 12-13 each illustrate a sequence of messages generated in the player incentivization feature in different gaming system configurations. In a simple configuration, the planting, maintenance, restoration, and harvesting activities occur completely within one game session on a common gaming device. A game session is defined by the time from when somebody sits down to play a game until they get up and leave. The planting and harvesting would happen within the common gaming session. This embodiment can be simple and essentially extends the game session. The feature would be implemented completely within the gaming device and cabinet and could be made such that no other gaming system component requirements are needed; that is, the feature could be controlled completely locally in the gaming device with no involvement from a gaming server. FIG. 12, by contrast, depicts messages exchanged in a host-assisted gaming system configuration. In this embodiment, the gaming session is created to save the state of the player engagement indicators with a remote gaming server. The gaming system could be created for a group of machines, an entire casino, or multiple casinos. The processors in the gaming machines communicate with each other and the gaming server either directly or through a SMIB (Slot Machine Interface Board). Players log into their game account on any gaming device in the gaming system, and the state of the player engagement indicators is stored with the gaming server. FIG. 13, in comparison, depicts messages exchanged in service window-based gaming system configuration. The service window is a display that represents a slot account host or gaming server. It can be displayed on the SMIB or could be a display on the EGM screen (e.g., a web browser displayed on the EGM that interacts with the gaming server). For this embodiment, it is likely that the gaming server interacts with a service window host to implement the feature. The gaming server would track the player engagement indicator state and the service window and gaming server would collectively provide the interface to plant, water and harvest the crops.

In the SMIB or service window-based gaming system configurations, the player could plant, maintain (e.g., water), and/or harvest crops using the service window or SMIB to access the data structures stored at the gaming server. This configuration can provide the framework for how a mobile application would work. The mobile application would communicate with the service window or SMIB and that service window or SMIB would communicate with the gaming server to allow the mobile application user to plant, maintain, or harvest the player engagement indicators. The mobile application would have some mechanism for the user to log into their player account, such as any of the authentication methods described below. In this model, when the player harvests the crops, the gaming server could transfer the award amount to the gaming device. In one embodiment this is achieved as an SAS AFT transfer as discussed below with reference to FIGS. 13-14.

Figure 10:
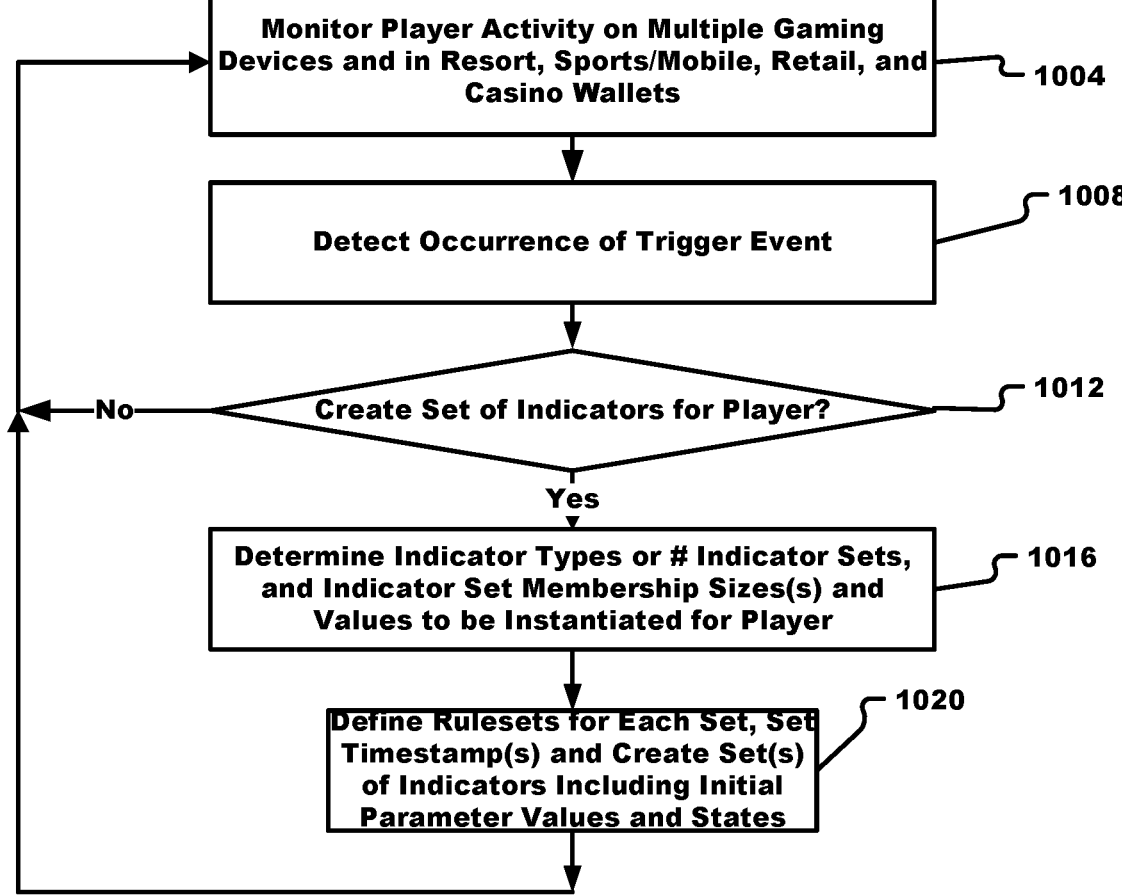
FIG. 10 is a flow diagram depicting a method of instantiating sets of player engagement indicators in accordance with embodiments of the present disclosure.

With reference now to FIGS. 10 and 12, a method of creating a set of player engagement indicators for a given player will be described in accordance with embodiments of the present disclosure.

The method begins in step 1004 with the gaming server 116 monitoring player activities on multiple gaming devices 112 and in the resort, sports/mobile, retail, and casino wallets 118, 126, 122, and 120, respectively, to detect predetermined gaming session and loyalty point award activities. The activities may or may not require the player 124 to input his or her loyalty point account information, such as by swiping a player loyalty card, but generally require the player to be authenticated successfully (such as by carding or cashless gaming techniques) with a gaming device or server.

The method may continue in step 1008 by the gaming server 116 applying one or more player indicator rulesets to the detected activities to detect one or more trigger events. As noted, the trigger event is typically one or more of an amount of game play by the selected player over a selected time interval, an amount of money spent by the selected player over the selected time interval on gaming and nongaming offerings of the gaming establishment, occurrence of a game event, occurrence of a system event, and occurrence of a random event. For example, players who trigger a royal flush or win a Lucky Coin event might be allowed to harvest the indicator. In some embodiments, the parameter value or state of an indicator is determined by a sequence of events such as playing a series of games, triggering a series of events, or making a series of transactions at the gaming establishment.

The method can continue in query 1012 by the gaming server 116 determining whether or not to create a set of player engagement indicators for the player receiving a stimulus relating to offering a selected player an option to create the indicators. The stimulus can take many forms, including receipt of a player request, occurrence of a trigger event (such as detection of a minimum loyalty point balance in the player's account or occurrence of a game event, system event, or random event, detection of a minimum amount of play by the player within a predetermined amount of time, detection of an amount of money spent at the gaming establishment within a predetermined amount of time, and the like).

The subsequent interaction with the player typically requires the player to be authenticated by the gaming system. As shown in FIG. 12, authentication can require the player 124 to provide credentials 1204, such as by carding in or cashless gaming authentication techniques, to the gaming device 112, which then forwards an electronic message 1208 to the gaming server 116 to initiate a session to create one or more sets of player engagement indicators.

When the player declines the option to create any set of player engagement indicators, the gaming server returns to and repeats step 1004.

When the player elects by input 1212 to create a set of player engagement indicators, the gaming device 112 forwards a series of electronic message 1216 comprising a notification of the player election to the gaming server 116 and, in response, the gaming server 116 proceeds to step 1016 and, continuing the series of electronic messages 1216, determines the player engagement indicator types, number of player engagement sets to be created, player engagement indicator set membership sizes (e.g., crop size), and/or award value of each set of player engagement indicator to be instantiated for the player. As noted, these characteristics of each of the player engagement indicator sets and how many and what type of player engagement indicator can be created can depend not only on the detected trigger event but also other factors, such as player tier level, current loyalty point balance, current balance in the sports/mobile wallet 126, retail wallet 122, casino wallet 120, and/or resort wallet 118, intensity of gameplay, and/or type of gaming session (e.g., slots, video poker, sports gaming, and the like), among others.

The method can continue in step 1016 by the gaming server 116, through continued electronic messages 1216, defining player engagement indicator rulesets to determine a type and number, membership size, or value of player engagement indicator sets to be instantiated for the player. For each set of player engagement indicators, the gaming server 116 defines, in each ruleset, a set of timestamps for key events, such as minimum and maximum time periods for the player engagement indicators to be maintained and/or made ready for harvest and minimum and maximum time periods for the player to complete harvest of the set of player engagement indicators and sets initial player engagement indicator parameter values and/or states.

In an exemplary embodiment, a carded player triggers the player incentivization feature in the form of a cash harvest award. If the player chooses to participate in the cash harvest award and create one or more sets of player engagement indicators, the gaming server 116 provides the player with a brief explanation of the cash harvest award and displays several avatars for the player to choose as his or her "farmer". For example, the gaming system 100 can display three male three female avatars from which the player is to select one. Once an avatar is selected, the selected avatar becomes the player's avatar for all future activities in the cash harvest application, such as during the planting, maintaining, harvesting, and/or restoring activities. The gaming system 100 next displays the different types of player engagement indicators in the form of crops which the player is eligible to create a set of player engagement indicators or "plant". The paytable of FIG. 9, for example, could be displayed.

Figure 7:
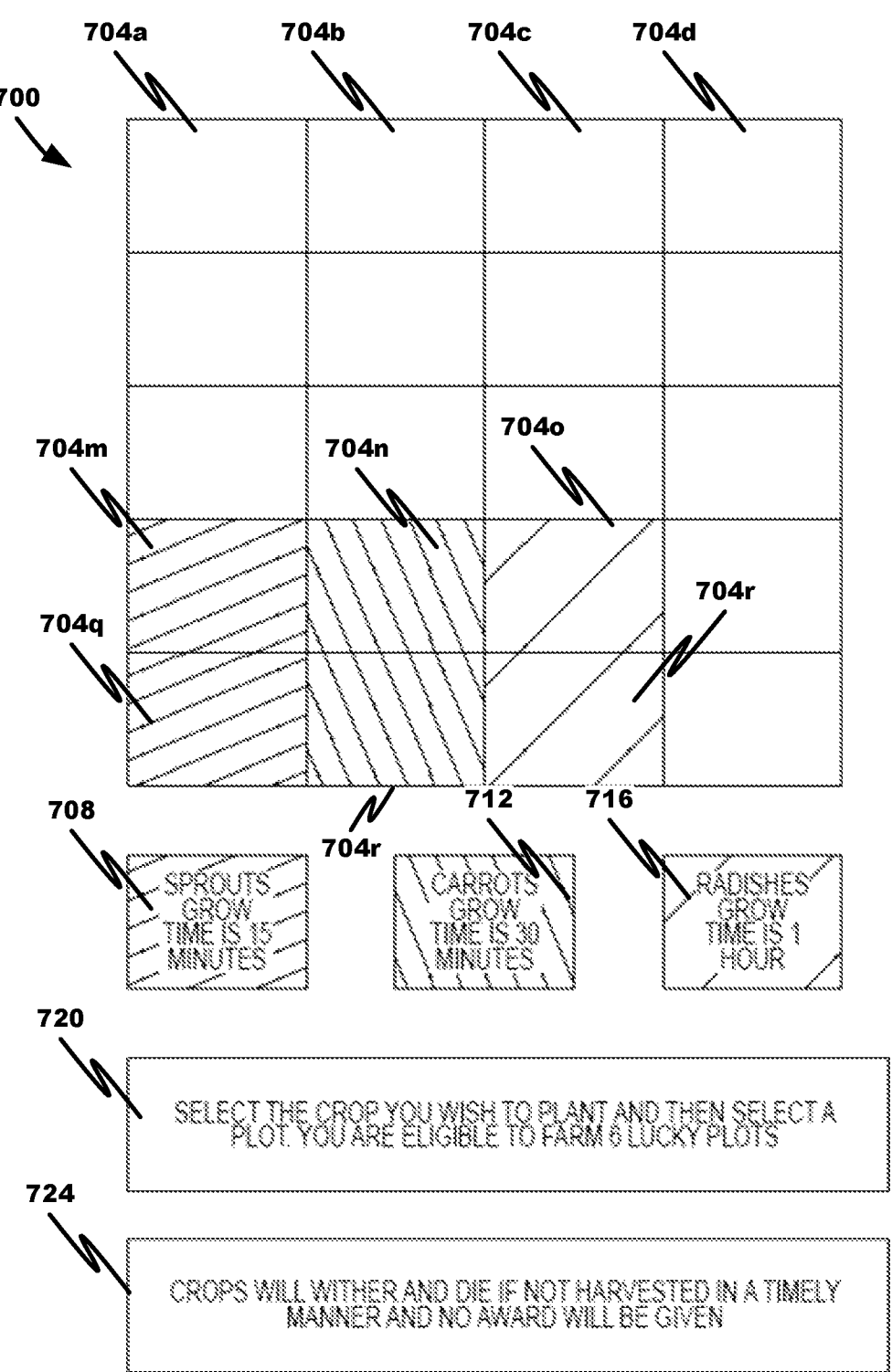
FIG. 7 is a screenshot of a gaming device display in accordance with embodiments of the present disclosure.

With reference to FIG. 7, the gaming system 100 provides in a display 700 a number of plots 704*a-t* that are eligible for receiving or "planting" a selected set of player engagement indicators. The higher the player's tier the more plots will be eligible for planting. The lower the player's tier the less plots will be eligible for planting. In one embodiment, the number of plots available to the player is a function of the player loyalty or achievement status. For example, a new player may only have two plots available, but a gold level player may have 16 plots available. The display 700 further comprises an explanation of each type of crop, e.g., in a block 708 the description "sprouts grown time is 15 minutes", in block 712 the description "carrots grow time is 30 minutes", and in block 716 the description "radishes grow time is one hour". The end of the grow time, the crop is ready for harvest. The display 700 further comprises in block 720 the command "select the crop you wish to plant and then select a plot [e.g., any of plots 700*a-t*]" and "you are eligible to farm 6 lucky plots" and in block 724 the description "crops will wither and die if not harvested in a timely manner and no award will be given". As can be seen in FIG. 7, the player has already touched the plots causing his farmer icon to plant sprouts in plots 704*m* and *q*, carrots in plots 704*n* and *r*, and radishes in plots 704*o* and *s*.

The gaming system defines a ruleset for each selected set of player engagement indicators and plot indicating, for example, the time period required for the crop to grow and be ready for harvest and the award value of that crop if successfully harvested in the configured time period. Each plot is associated with past or future timestamps indicating a time of creation or planting and for subsequent activities associated with the crops on the plot (e.g., maintenance activities, restoration activities, and harvest activities) and a parameter value set or state for the player engagement indicators or crop planted in the plot. For example, already planted plots 704*m-o* and *q-r* are associated with first and second timestamps, respectively, for planting or creating and third and fourth timestamps, respectively, indicating when the crop is ready for harvest or must be harvested, e.g., sprouts need to be harvested within 45 minutes, carrots within 90 minutes, and radishes within three hours. In some embodiments, players can choose to plant a single crop of a selected type of player engagement indicator or if the player is eligible to multiple (e.g., up to four) sets of player engagement indicators or crops of the same or different types, the player can select to plant the same or different crops in all of the available plots. The gaming system 100 periodically sends electronic messages reminding the player that the player must come back once the crops are grown to harvest his or her award. Crops will wither and 'die' if not harvested in a timely manner and no award will be given.

Figure 11:
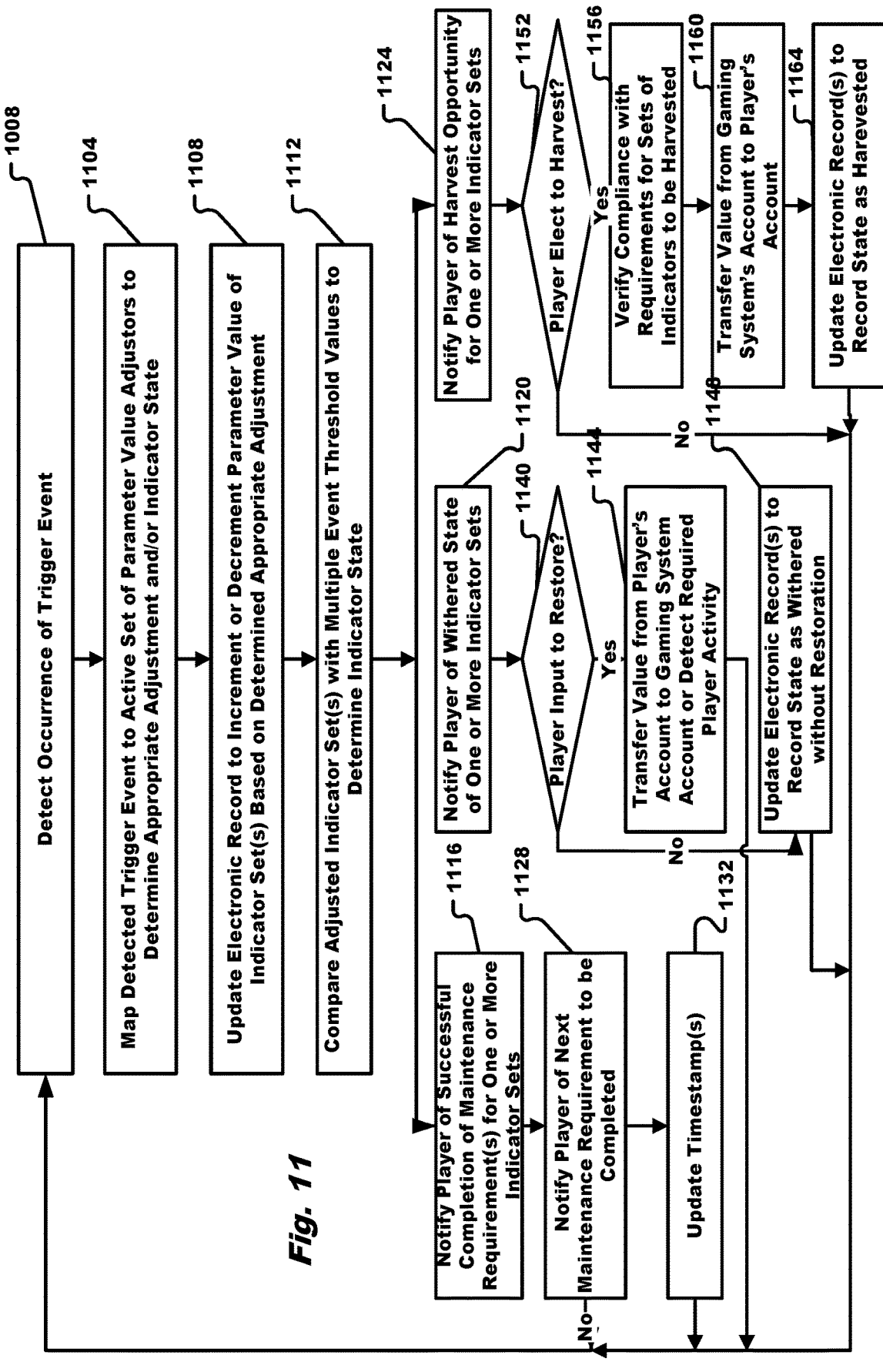
FIG. 11 is a flow diagram depicting a method of managing sets of player engagement indicators in accordance with embodiments of the present disclosure.

With reference now to FIGS. 11 and 12, a method of managing, restoring, and harvesting a set of player engagement indicators for a given player will be described in accordance with embodiments of the present disclosure.

After a trigger event is detected in step 1008, the gaming server can continue to step 1104 and determine whether the player associated with the trigger event has one or more active sets of player engagement indicators and, for any active set of player engagement indicators, maps, in accordance with the appropriate ruleset, the detected trigger event to a set of parameter value adjustors to determine appropriate adjustment and/or indicator state. For example, the detected trigger event may be mapped to a maintenance or restoration requirement, which causes the parameter value of the indicator to be incremented or decremented (depending on the configuration) to indicate a growth level of the indicator (e.g., initial growth level of 30% increased to next growth level of 40% of mature growth level of 100%). Conversely, the detected trigger event may be mapped to a maintenance requirement failure, which causes the parameter value of the indicator to be decremented or incremented (depending on the configuration) to indicate that the indicator has withered and requires restoration.

The method can continue in step 1108 with the gaming server 116 updating an electronic record associated with the player to increment or decrement the parameter value of the indicator set(s) based on the determined appropriate adjustment.

The method can continue in step 1112 by the gaming server 116 comparing the adjusted indicator set(s) with multiple event threshold values to determine an indicator state.

When the parameter value has a value above or below a first threshold (depending on the configuration), the gaming server 116 determines that the player has successfully completed a maintenance requirement and proceeds to step 1116.

The gaming device 112 in step 1116 notifies the player by a series of electronic messages 1120 that he or she has successfully completed a maintenance requirement for one or more indicator sets and in step 1128 of a next maintenance requirement to be completed for the one or more indicator sets and through a series of electronic messages 1124 the gaming server 116 of successful completion of the maintenance requirement.

The method can continue in step 1132 by the gaming server 116 updating timestamps to reflect the requirement completion and a deadline to complete the next requirement.

In an exemplary embodiment, players can check the status of the crops they have planted and how soon the crops will be ready for harvesting. The gaming system sends a text message or email message to the player saying their crops are ready for harvest. The gaming system alerts the player that the crops are ready for harvesting via the service window 278 as long as they are carded in on any EGM that is service window-enabled. The player can simply insert cards into the EGM and begin to play or be in the process of playing. Players can see the status of their crops via the service window 278. From the service window 278, the player will select cash harvest, and, in response, the gaming device 112 will display the plots of land. Plots that have had crops planted shall show the crops in various stages of growth, such as 30%—small green sprouts of plant as shown in FIG. 8A; 70%—medium size plant with somewhat recognizable version of what was planted as shown in FIG. 8B; and 100%—fully grown plant as shown in FIG. 8C.

When the parameter value has a value above or below a second threshold (depending on the configuration), the gaming server 116 determines that the player has failed to successfully complete a maintenance requirement and proceeds to step 1120.

In step 1120, the gaming server 116 updates the state of the set of indicators to withered and notifies the player by a series of electronic messages that he or she has failed to complete a maintenance requirement for a set of player engagement indicators and that the indicator set has entered the withered state.

The method can continue in query 1140 by the gaming server 116 asking the player whether or not the indicator set is to be restored.

When player input is received to restore the indicator set, the gaming device 112 notifies the gaming server 116 in the series of electronic messages and the gaming server 116 in step 1144 transfers value from the resort wallet of the player to the resort wallet of the gaming system operator and/or detects a required player activity for restoration to be completed. In response, the gaming server 116 updates an electronic record to indicate that the indicator set has been restored and is in the maintenance state.

When no player is received timely or the player input indicates that the indicator set is not to be restored, the gaming server 116 in step 1148 updates an electronic record to record the state of the indicator set as withered without restoration.

In an exemplary embodiment, when the player has crops in the withered state the gaming system 100 asks the player if he or she would like to restore the withered crops. When the player selects "No", he or she can continue on to harvest non-withered crops or they can select "Yes", and thereafter be presented with one or more options to restore their crops. Typically, the player restores withered crops using earned loyalty or game points and/or a cash payment and/or gameplay as a certain amount of points or cash payment or gameplay can 'buy' to have crops restored.

When the player can use points to restore withered crops, the player selects this as an option. In response, the gaming system 100 may display a message like, "For 100 points your crops will be restored." When the player selects "No", the player is returned to the screen that displays their crops so they can harvest other available crops. When the player selects "Yes", the gaming system 100 may display a message like, "You are about to use 100 points to restore your crops, do you wish to continue?". When the player selects "No", the player is returned to the screen that displays their crops so they can harvest other available crops. When the player selects "Yes", the player receives a displayed message such as "100 points have been deducted and your crops have been restored." The gaming system 100 then returns the player to the screen that displays their crops and the crops that had been shown as having died and withered are now fully restored, ready for harvest or further maintenance.

When the player can use further gameplay to restore withered crops, the gaming system 100 provides a displayed message such as, "Play for xxxx amount of time to have your crops restored." When the player selects the above option to play on the EGM that the player is currently on or on any EGM that is service window enabled, the gaming system will track the start of the gaming session that the play time is to be used toward the total amount of play time needed to have crops restored. Time does not need to be accrued in a single session but may be accrued in several independent sessions over a predetermined time period if the player wishes to play on several different EGMs or on the same EGM at different times to complete the required play time to have their crops restored. A clock can be displayed in the service window 278 showing time played and remaining time that needs to be played for crops to be restored, such as displaying a message such as, "You have played 00:17:35 you need to play for another 00:42:65 to have your crops restored." Once the player has completed the required amount of play time, the gaming system 100 displays a message such as, "You have completed the needed play time. Your crops have been restored and are ready for harvest." The message shall close after a selected number of seconds. In any event, the crops are thereafter displayed no longer as shown in FIG. 8D but as shown in any of FIGS. 8A-C.

When the parameter value has a value above or below a third threshold (depending on the configuration), the gaming server 116 determines that the player has successfully completed all maintenance requirements and proceeds to step 1124.

In step 1124, the gaming server 116 notifies the player by a series of electronic messages that he or she has successfully completed all maintenance requirements for a set of player engagement indicators and that the indicator set has entered the ready to harvest state.

The method can continue in query 1152 by the gaming server 116 determining whether the player elects to harvest the set of indicators in the ready to harvest state.

When player input 1128 is received that the set of indicators is to be harvested, the gaming device through the series of electronic messages 1132 notifies the gaming server 116 that the set of indicators to be harvested and the gaming server in step 1156 determines that the player has complied fully with the requirements for harvesting of the set of indicators.

In response, the gaming server in step 1160 transfers value from the gaming operator's resort wallet to the player's resort wallet and in step 1164 updates an electronic record to record the state of the set of indicators as being harvested.

After steps 1132, 1144, 1148, and 1164 and when the player has not elected to harvest the set of indicators in query 1152, the gaming server 116 returns to and repeats step 1008.

In an exemplary embodiment, once the planted crops are fully grown the player can harvest them and claim their award. When crops are ready for harvesting, the gaming server 116 opens the service window 278 and possibly displays a message like, "Your crop of carrots are ready for harvesting". After so many seconds the service window display closes. The player can open the service window 278 on the EGM. The player can navigate to cash harvest and display the plots of land. The player can press on each plot of land causing the farmer avatar to harvest the crop and the player is then awarded their award or bonus for each plot harvested. For example, each plot of harvested carrots is worth $2.00 of extra credit such that when the six plots are successfully harvested so $12.00 of extra credit is awarded. The crops will wither and 'die' as shown in FIG. 8D, and no bonus will be awarded if players fail to harvest their crops within the allotted time frame. After restoration of the crops as discussed above, the player can continue playing or can navigate to cash harvest via the service window 278 to harvest their restored crops.

With reference to FIG. 13, a method for harvesting crops in accordance with an embodiment of the present disclosure will be discussed.

The player 124 provides input 1304 to the gaming device 112 that the player desires to harvest one or more sets of player engagement indicators.

In response, the processor of the gaming device 112 notifies the service window 278 of the gaming device 112 by electronic message 1308 that the one or more sets of player engagement indicators are to be harvested.

In response, the service window 278 of the gaming device 112 notifies the gaming server 116 by electronic message 1312 that the one or more sets of player engagement indicators are to be harvested.

In response, the gaming server 116 instructs by electronic message 1316 the database management system of the database 184 to transfer the award amount from the resort wallet of the operator to the resort wallet of the player.

The database management system creates a transaction 1320 and credits the award amount from the operator's resort wallet and debits 1324 it to the player's resort wallet. The transaction 1320 is then updated to show completion of the transaction.

The player 124 subsequently provides input 1328 to the gaming device 112 that the player desires to cashout the award amount from the player's resort wallet.

In response, the processor of the gaming device 112 notifies the service window 278 of the gaming device 112 by electronic message 1332 that the award amount is to be cashed out of the player's resort wallet.

In response, the service window 278 of the gaming device 112 notifies the gaming server 116 by electronic message 1334 that the award amount is to be cashed out of the player's resort wallet.

In response, the gaming server 116 instructs by electronic message 1335 the database management system of the database 184 to transfer the award amount from the resort wallet of the player to the player.

The database management system updates the transaction 1336 and credits the award amount from the player's resort wallet and transfers it to the player.

The transfer can be accomplished in at least two ways. In a first way, an AFFTransfer 1340 from the player's resort wallet to the SMIB and card reader 266 for the ticket issuance device 250. In a second way, an automated file transfer or AFFTransfer 1340 from the player's resort wallet to the gaming device 112 for the currency out device 262.

The transaction 1320 is then updated to show completion of the cashout transaction and an electronic message 1352 sent to the gaming device (or SMIB and card reader) notifying the player of the new balance on the resort wallet.

In another embodiment of the present disclosure, cashless transfers are made to and from the player's resort wallet via an application on the mobile device 114. In that event, the mobile device 114 would interact with the gaming device 112 to perform the steps shown in FIG. 13 above.

In that event, the player 124 using his or her mobile device 114 may be required to establish a pairing or linkage between the mobile device 114 and the gaming device 112. The pairing or linkage between the mobile device and the gaming system (e.g., EGM or kiosk) occurs via one or more applications being run or executed on the mobile device. In certain embodiments, the mobile device application utilized to effect cash transfer to and from the gaming system 100 is a location based digital wallet enabled application, such as a Passbook-enabled or Wallet-enabled application, which is accessible when the player enters a gaming establishment. In certain embodiments, the mobile device application utilized to effect cash transfer to and from the gaming system is downloaded to the mobile device from an application store. In certain embodiments, the mobile device application utilized to transfer cash to and from the gaming system is downloaded to the mobile device from one or more websites affiliated with the gaming establishment (which are accessible directly by the player and/or by a link opened when the player scans a QR code associated with the EGM).

In certain embodiments, after a player has opened an application on a mobile device and selected an action to be performed, the gaming system determines if the mobile device application is associated with an active authorization token previously created by the system. In these embodiments, an authorization token is a time-based token that expires after a designated period of time and that is associated with an additional level of player authentication beyond a player's application username and application password.

If the gaming system determines that the application is not associated with an active authorization token previously created by the system, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage a gaming device (or a component of the gaming device), such as prompting the player to tap the mobile device to a designated portion of the gaming device. It should be appreciated that any reference herein to a player tapping the mobile device to a designated portion of the gaming device (or a component of the gaming device) may or may not include the player pressing a fingerprint scanner (if the mobile device is equipped with such a fingerprint scanner) while concurrently engaging the gaming device (or a component of the gaming device). In other embodiments, the mobile device application verifies the identifying information of the player by communicating with a verification/authentication server over one or more wireless communication protocols, such as Wi-Fi protocol, a cellular communication protocol (e.g., 3G or LTE), to obtain the active authorization token.

In certain embodiments, following the player causing the mobile device to engage the gaming device (e.g., the player taps the mobile device to a player tracking card reader or other designated location(s) of the gaming device), the mobile device application communicates, via a wireless communication protocol, the provided identifying information and the requested action to be performed to the gaming device (or to a component associated with the gaming device). For example, upon the player tapping the mobile device to a player tracking card reader or other designated location(s) of the gaming device (or otherwise moving the mobile device to within a designated distance of the player tracking card read or other designated locations(s) of the gaming device), the mobile device application sends the identifying information and the requested action to a component of a gaming establishment management system located inside the gaming device (i.e., a component of the gaming device), such as a NexGen™. player tracking component of an Advantage™ system. NexGen™. and Advantage™.

If the gaming system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the gaming device, such as tapping the mobile device to a designated portion of the gaming device.

On the other hand, if the gaming system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

Following the creation of an authorization token, the gaming system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the gaming device (i.e., a component of the gaming device), such as a NexGen™ player tracking component of an Advantage™. system, communicates the created authorization token to the mobile device and proceeds with executing the requested action.

On the other hand, following a determination that the mobile device application is associated with a previously created and stored authentication token, the mobile device application prompts the player to cause the mobile device to engage the gaming device, such as prompting the player to tap the mobile device to a designated portion of the gaming device.

Following the player causing the mobile device to engage the gaming device (e.g., the player taps the mobile device to a player tracking card reader or other designated location(s) of the gaming device), the mobile device application communicates, via a wireless communication protocol, the previously stored authorization token and the requested action to be performed to the gaming device (or to a component associated with the gaming device). For example, upon the player tapping the mobile device to a player tracking card reader or other designated location(s) of the gaming device, the mobile device application sends the stored authorization token and the requested action to a component of a gaming establishment management system located inside the gaming device (i.e., a component of the gaming device), such as a NexGen™ player tracking component of an Advantage™ system.

Following the communication of the stored authorization token and the requested action to the gaming device or a component associated with the gaming device, the system determines if the communicated authorization token is still valid. For example, a gaming system component configured to operate with a player tracking system determines whether the authorization token is valid (i.e., active and non-expired).

If the gaming system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the gaming system determines that the stored authorization token is valid, the system proceeds with executing the requested action. For example, upon the determination that the communicated authorization token is valid, the component of a gaming establishment management system located inside the gaming device proceeds with executing the requested action and communicates a requested action response to the mobile device.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, RAM, ROM, EEPROM or Flash memory, an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A gaming system comprising:
   a network communications interface;
   a processor coupled with the network communications interface; and
   a memory coupled with and readable by the processor and storing therein a set of instructions which, when executed by the processor, causes the processor to:
      receive, through the network communications interface, an electronic message comprising a request to create a set of engagement indicators, wherein a parameter value of the set of engagement indicators depends directly upon a monitored engagement level over time;

generate an electronic record to define the set of engagement indicators, the set of engagement indicators being associated with a first parameter value and a first state, and a corresponding ruleset defining a relationship between a parameter value of the set of engagement indicators and different monitored engagement levels;

in response to a stimulus, determine a time period of nonengagement with the gaming system;

in response to the determined time period of nonengagement exceeding a selected threshold, update the electronic record to associate the set of engagement indicators with a second parameter value different than the first parameter value and change the first state to a second state, an award associated with the set of engagement indicators being nonredeemable when the set of engagement indicators are in the second state;

in response to the determined time period of nonengagement being less than the selected threshold and when a current parameter value associated with the set of engagement indicators is less than a selected threshold parameter value, update the electronic record to associate the set of engagement indicators with a third parameter value different from the first parameter value, the award associated with the set of engagement indicators being nonredeemable when the set of engagement indicators is associated with the third parameter value, and in response to the determined time period of nonengagement being less than the selected threshold and when the current parameter value associated with the set of engagement indicators is at least the selected threshold parameter value, update the electronic record to associate the set of engagement indicators with a fourth parameter value, wherein the award associated with the set of engagement indicators is redeemable when the set of engagement indicators is associated with the fourth parameter value.

2. The gaming system of claim 1, wherein the determined time period of nonengagement is less than the selected threshold and the current parameter value associated with the set of engagement indicators is at least the selected threshold parameter value, wherein a clock is associated with the set of engagement indicators, wherein the time period is related to a clock parameter value of the clock, wherein the processor starts the clock when a player logs out of the gaming system and stops the clock when the player successfully logs on the gaming system, and wherein the set of instructions further cause the processor to:

receive, through the network communications interface, a request from the player to change the parameter value of the set of engagement indicators; and decrement the electronic record associated with the player and increment an electronic record associated with the gaming system to transfer a portion of the award to a gaming system operator; and in response to decrementing the electronic record, update the electronic record associated with the player to change the parameter value associated with the set of engagement indicators from the second parameter value to the first parameter value.

3. The gaming system of claim 1, wherein the set of instructions cause the processor to:

receive, through the network communications interface, a further electronic message indicating that a player, in a gaming session, has received a gameplay award;

receive, through the network communications interface, a further request to transfer at least a portion of the gameplay award to the set of engagement indicators, wherein the first parameter value associated with the set of engagement indicators depends upon the transferred at least a portion of the gameplay award; and select the set of engagement indicators from a plurality of sets of engagement indicators, each member of the plurality of sets of engagement indicators being associated with a different one of an amount and probability of winning the award.

4. The gaming system of claim 1, wherein the set of instructions cause the processor to:

determine that the current parameter value associated with the set of engagement indicators is at least the selected threshold parameter value;

send, through the network communications interface, a further electronic message to a gaming device of a player to redeem the award within a specified redemption period; and apply the following rules:

when the player redeems the award within the specified redemption period, update the electronic record associated with the player to include transfer of the award by the gaming system and change the parameter value associated with the set of engagement indicators to a default parameter value; and when the player redeems the award within the specified redemption period, update the electronic record associated with the player to change the parameter value associated with the set of engagement indicators to a parameter value different from the default parameter value and a prior parameter value of the set of engagement indicators.

5. The gaming system of claim 1, wherein one of an amount and probability of winning the award when associated with the first parameter value is higher than the one of the amount and probability of winning the award when associated with the second parameter value and wherein the set of instructions cause the processor to:

determine a second time period during which a player is engaged with the gaming system, the second time period being at least a threshold time value; and based on the determined second time period, update the electronic record to associated the set of engagement indicators with a fifth parameter value, wherein the one of an amount and probability of winning the award for the fifth parameter value is higher than the one of the amount and probability of winning the award for the first and second parameter values.

6. The gaming system of claim 1, wherein the set of instructions cause the processor to:

receive a further electronic message indicating a game activity involving a player, wherein the game activity is one of an amount of game play by the player over a selected time interval, an amount of money spent by the player over the selected time interval on one of gaming and non-gaming offerings, occurrence of a predetermined game event or game outcome, occurrence of a predetermined system event, and occurrence of a random event;

determine that a game result corresponds to a member of a predetermined set of game outcomes; and based on the determination that the game result corresponds to the member of the predetermined set of game outcomes, update the electronic record to associate the set of engagement indicators with a fifth parameter value, wherein the first and second parameter values are less than the fifth parameter value and the fifth parameter value is less than the fourth parameter value.

7. The gaming system of claim 1, wherein the set of engagement indicators are associated with the second parameter value and wherein the set of instructions cause the processor to determine that a player has performed one of an amount of game play by the player over a selected time interval, an amount of money spent by the player over the selected time interval on gaming and/or non-gaming offerings, occurrence of a predetermined game event or game outcome, occurrence of a predetermined system event, and occurrence of a random event; and, in response to the determination that the player has performed one of the amount of game play by the player over the selected time interval, update the electronic record to change the second state to the first state.

8. A method comprising:

receiving, through a network communications interface, a request to create an engagement indicator, wherein a state of the engagement indicator depends upon an engagement level measured over a selected time period;

generating, by a processor, an electronic record to define the engagement indicator, the engagement indicator being associated with a first parameter value and a first state, and a corresponding ruleset defining a relationship between a parameter value of the engagement indicator and different monitored engagement levels;

in response to a stimulus, determining, by the processor, a time period of nonengagement with a gaming system, the determined time period of nonengagement being at least the selected time period;

in response to the determined time period of nonengagement exceeding a selected threshold, updating, by the processor, the electronic record to associate the engagement indicator with a second parameter value different than the first parameter value and change the first state to a second state, an award associated with the engagement indicator being nonredeemable when the engagement indicator is in the second state;

in response to the determined time period of nonengagement being less than the selected threshold and when a current parameter value associated with the engagement indicator is less than a selected threshold parameter value, updating, by the processor, the electronic record to associate the engagement indicator with a third parameter value different from the first parameter value and third state, the award associated with the engagement indicator being nonredeemable when the engagement indicator is associated with the third state, and in response to the determined time period of nonengagement being less than the selected threshold and when the current parameter value associated with the engagement indicator is at least the selected threshold parameter value, updating, by the processor, the electronic record to associate the engagement indicator with a fourth parameter value and fourth state, wherein the award associated with the engagement indicator is redeemable when the engagement indicator is in the fourth state.

9. The method of claim 8, wherein one of an amount and probability of winning an award for the first state is higher than the one of the amount and probability of winning the award for the second state and wherein a clock is associated with the engagement indicator, and wherein the time period is related to a value of the clock, and further comprising:

starting, by the processor, the clock when a player logs out of the gaming system;

stopping, by the processor, the clock when the player successfully logs in to the gaming system;

receiving, through the network communications interface, a request from the player to change a state of the engagement indicator; and decrementing, by the processor, the electronic record and incrementing, by the processor, an electronic record associated with the gaming system to transfer a portion of the award to a gaming system operator; and in response to the decrementing, updating, by the processor, the electronic record to change the state of the engagement indicator from the second state to the first state.

10. The method of claim 8, further comprising:

receiving, through the network communications interface, an electronic message indicating that a player, in a gaming session, has received a gameplay award;

receiving, through the network communications interface, a further request from the player to transfer at least a portion of the gameplay award to the engagement indicator, wherein the state of the engagement indicator and first parameter value depend upon the transferred at least a portion of the gameplay awards; and selecting, by the processor, the engagement indicator from a set of engagement indicators, each member of the set of engagement indicators being associated with a different one of an amount and probability of winning the award.

11. The method of claim 8, further comprising:

determining, by the processor, that a current state of the engagement indicator is at least a threshold state;

sending, by the processor, an electronic message to a gaming device of a player to redeem the award within a specified redemption period; and applying, by the processor, the following rules:

when the player redeems the award within the specified redemption period, update the electronic record associated with the player to include transfer of the award by the gaming system and change the state of the engagement indicator to a default state; and when the player redeems the award within the specified redemption period, update the electronic record associated with the player to change the state of the engagement indicator to a state different from the default state and a prior state of the engagement indicator.

12. The method of claim 8, wherein one of an amount and probability of winning the award when associated with the first parameter value is higher than the one of the amount and probability of winning the award when associated with the second parameter value and further comprising:

determining, by the processor, a second time period during which a player is engaged with the gaming system, the second time period being at least a threshold state; and based on the determined second time period, updating, by the processor, the electronic record associated with the player to change the engagement indicator to a fifth state, wherein the one of an amount and probability of winning the award for the third state is higher than the one of the amount and probability of winning the award for the second state.

13. The method of claim 8, further comprising:

receiving, by the processor, an electronic message indicating a game activity involving a player, wherein the game activity is one of an amount of game play by the player over a selected time interval, an amount of money spent by the player over one of the selected time interval on gaming and non-gaming offerings, occurrence of a predetermined game event or game outcome, occurrence of a predetermined system event, and occurrence of a random event;

determining, by the processor, that a game result corresponds to a member of a predetermined set of game outcomes; and based on the determination that the game result corresponds to the member of the predetermined set of game outcomes, updating, by the processor, the electronic record to change the engagement indicator to a third state, wherein the one of an amount and probability of winning an award for the third state is higher than the one of the amount and probability of winning the award for the second state.

14. The method of claim 13, wherein the engagement indicator is associated with the second parameter value and further comprising determining, by the processor, that the player has performed one of an amount of game play by the player over a selected time interval, an amount of money spent by the player over the selected time interval on gaming and/or non-gaming offerings, occurrence of a predetermined game event or game outcome, occurrence of a predetermined system event, and occurrence of a random event; and, in response to the determination, and updating the electronic record to change the second state to the first state.

15. A gaming server comprising:

a network communications interface;

a processor coupled with the network communications interface; and a memory coupled with and readable by the processor and storing therein a set of instructions which, when executed by the processor, causes the processor to:

receive, from a service window of a gaming machine and through the network communications interface, a request to create an engagement indicator, wherein a parameter value of the engagement indicator depends upon an engagement level as a function of time;

create an electronic record to define the engagement indicator, the engagement indicator being associated with a first parameter value and a first state, and a corresponding ruleset defining a relationship between a parameter value of the engagement indicator and different monitored engagement levels;

send, through the network communications interface and to the service window, an electronic message acknowledging creation of the electronic record;

in response to a stimulus, determine a time period of nonengagement with a gaming system interacting with the gaming server;

in response to the determined time period of nonengagement exceeding a selected threshold, update the electronic record to associate the engagement indicator with a second parameter value different than the first parameter value and change the first state to a second state, an award associated with the engagement indicator being nonredeemable when the engagement indicator is in the second state;

in response to the determined time period of nonengagement being less than the selected threshold and when a current parameter value associated with the engagement indicator is less than a selected threshold parameter value, update the electronic record to associate the engagement indicator with a third parameter value different from the first parameter value and third state, the award associated with the engagement indicator being nonredeemable when the engagement indicator is associated with the third state, in response to the determined time period of nonengagement being less than the selected threshold and when the current parameter value associated with the engagement indicator is at least the selected threshold parameter value, update the electronic record to associate the engagement indicator with a fourth parameter value and fourth state, wherein the award associated with the engagement indicator is redeemable when the engagement indicator is in the fourth state; and send, through the network communications interface, a further electronic message to a player indicating the update of the electronic record to change the engagement level.

16. The gaming server of claim 15, wherein one of an amount and probability of winning an award for the first state is higher than the one of the amount and probability of winning the award for the second state, wherein a clock is associated with the engagement indicator, wherein the time period is related to a parameter value of the clock, and wherein the set of instructions further cause the processor to:

receive, through the network communications interface and from the service window, a request to change a current parameter value associated with the engagement indicator; and decrement the electronic record and increment an electronic record associated with a gaming system to transfer a portion of a player award to a gaming system operator; and in response to decrementing the electronic record, update the electronic record to change the current parameter value associated with the engagement indicator from the second parameter value to the first parameter value.

17. The gaming server of claim 15, wherein the set of instructions cause the processor to:

receive, through the network communications interface and from the service window, a message indicating that a player, in a gaming session, has received a gameplay award;

receive, through the network communications interface and from the service window, a further request to transfer at least a portion of the gameplay award to the engagement indicator, wherein a current parameter value of the engagement indicator depends upon the transferred at least a portion of the award; and select the engagement indicator from a set of engagement indicators, each member of the set of engagement indicators being associated with a different one of an amount and probability of winning the award.

18. The gaming server of claim 15, wherein the electronic record defines a plurality of engagement level indicators, each of the plurality of engagement level indicators corresponding to a different of set of engagement rules and having a different amount and probability of winning the award and having different parameter values, and wherein the set of instructions cause the processor to:

determine that a current parameter value of the engagement indicator is at least a threshold parameter value;

send a message, through the network communications interface, to a gaming device of a player to redeem the award within a specified redemption period; and apply the following rules:

when the player redeems the award within the specified redemption period, update the electronic record associated with the player to include transfer of the award by a gaming system and change the current parameter value of the engagement indicator to a default parameter value; and when the player redeems the award within the specified redemption period, update the electronic record to change the current parameter value of the engagement indicator to a parameter value different from the default parameter value and a prior parameter value of the engagement indicator.

19. The gaming server of claim 15, wherein the set of instructions cause the processor to:

receive a message, through the network communications interface and from the service window, comprising a first clock setting indicating when a player successfully logs in and a second clock setting indicating when the player logs out;

based on the first and second clock settings, determine a second time period during which the player is engaged with a gaming system, the second time period having at least a threshold parameter value; and based on the determined second time period, update the electronic record to change the engagement indicator to a third parameter value, wherein the one of an amount and probability of winning an award for the third parameter value is higher than the one of the amount and probability of winning the award for the second parameter value.

20. The gaming server of claim 15, wherein the set of instructions cause the processor to:

receive a message indicating a game activity involving a player, the game activity being at least one of a game result of a gaming session and an intensity of play in the gaming session;

determine that the game result corresponds to a member of a predetermined set of game outcomes; and based on that the game result corresponds to the member of the predetermined set of game outcomes, update the electronic record to change the engagement indicator to a third parameter value, wherein the one of an amount and probability of winning an award for the third parameter value is higher than the one of the amount and probability of winning the award for the second parameter value.

* * * * *